(12) United States Patent
Ahn et al.

(10) Patent No.: US 11,692,054 B2
(45) Date of Patent: *Jul. 4, 2023

(54) COMPOSITION FOR SEEDED POLYMERIZATION, A CONJUGATED DIENE COPOLYMER, AN MOLDED BODY, AND A METHOD FOR PREPARING THE SAME

(71) Applicant: Korea Kumho Petrochemical Co., Ltd., Seoul (KR)

(72) Inventors: Du Seong Ahn, Daejeon (KR); Gwanghoon Kwag, Sejong-si (KR); Jae Kon Suh, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 723 days.

This patent is subject to a terminal disclaimer.

(21) Appl. No.: 16/661,653

(22) Filed: Oct. 23, 2019

(65) Prior Publication Data

US 2020/0199278 A1 Jun. 25, 2020

(30) Foreign Application Priority Data

Dec. 20, 2018 (KR) ........................ 10-2018-0165816

(51) Int. Cl.
  *C08F 236/10* (2006.01)
  *B60C 1/00* (2006.01)
  *B60C 11/00* (2006.01)

(52) U.S. Cl.
  CPC .......... *C08F 236/10* (2013.01); *B60C 1/0016* (2013.01); *B60C 11/0008* (2013.01); *B60C 2011/0025* (2013.01)

(58) Field of Classification Search
  CPC ............. C08F 236/10; B60C 2011/025; B60C 11/0008; B60C 1/0016
  See application file for complete search history.

(56) References Cited

U.S. PATENT DOCUMENTS

| 2,547,150 | A | * | 4/1951 | Blake | C08F 36/04 |
| | | | | | 558/243 |
| 5,393,633 | A | * | 2/1995 | Furukawa | G03G 9/13 |
| | | | | | 430/114 |
| 6,369,158 | B1 | | 4/2002 | Senyek et al. | |
| 2006/0281865 | A1 | * | 12/2006 | Komiyama | C08L 33/20 |
| | | | | | 525/230 |
| 2011/0136980 | A1 | * | 6/2011 | Pirra | C08F 2/38 |
| | | | | | 428/407 |
| 2020/0172648 | A1 | * | 6/2020 | Ahn | C08F 20/44 |

FOREIGN PATENT DOCUMENTS

| EP | 1674482 A1 | 6/2006 |
| GB | 913 590 | * 12/1962 |
| JP | 2004-018557 A | 1/2004 |
| JP | 2011-529999 A | 12/2011 |
| KR | 10-2005-0004949 A | 1/2005 |
| KR | 10-2012-0022623 A | 3/2012 |
| KR | 10-1613752 B1 | 4/2016 |

* cited by examiner

Primary Examiner — Robert D Harlan
(74) Attorney, Agent, or Firm — NKL Law; Jae Youn Kim

(57) ABSTRACT

A composition for seeded polymerization includes: a seed copolymer which has a compound having dithioate, a mercaptan compound, a first aromatic vinyl monomer, and a first conjugated diene monomer, and has an average particle diameter of 10-30 nm; a second aromatic vinyl monomer; and a second conjugated diene monomer.

18 Claims, 20 Drawing Sheets

COMPOSITION FOR SEEDED POLYMERIZATION, A CONJUGATED DIENE COPOLYMER, AN MOLDED BODY, AND A METHOD FOR PREPARING THE SAME

CROSS-REFERENCE TO RELATED APPLICATION

This application claims the priority benefit of Korean Patent Application No. 10-2018-0165816, filed on Dec. 20, 2018 in the Korean Intellectual Property Office, the disclosure of which is incorporated herein by reference.

BACKGROUND OF THE DISCLOSURE

Field of the Disclosure

The present disclosure relates to a conjugated diene random copolymer and a method for preparing the same. More particularly, the present disclosure relates to a conjugated diene random copolymer using seeded polymerization and a method for preparing the same.

Description of the Related Art

Emulsion styrene butadiene rubber (ESBR) has a low manufacturing cost, can be synthesized in a relatively easy manner, and also has excellent properties. Thus, emulsion styrene butadiene rubber is widely used for general-purpose products. However, as solution styrene butadiene rubber (SSBR) that has been recently commercialized is gaining price competitiveness, the demand for emulsion styrene butadiene rubber has decreased. Compared with solution styrene butadiene rubber, emulsion styrene butadiene rubber has a higher molecular weight, and accordingly has excellent wear resistance, whereas it has a broader molecular weight distribution, and accordingly has lowered fuel efficiency.

The fuel efficiency may be improved by narrowing the molecular weight distribution of emulsion styrene butadiene rubber and reducing the low molecular weight. However, it is difficult to control molecular weight distribution using the conventional free radical polymerization. The fuel efficiency may be improved by synthesizing emulsion styrene butadiene rubber with a narrow molecular weight distribution by introducing reversible addition-fragmentation chain transfer (RAFT), which is one of the controlled radical polymerization recently under research. However, the reversible addition-fragmentation chain transfer agent is present mostly in droplets at the initial stage of reaction due to hydrophobic properties of the agent, thereby making micelle dispersion difficult, slowing down the reaction rate, and making it difficult to be commercialized.

Other than changing the polymerization method, it is possible to improve wear resistance and mechanical properties by introducing a third monomer having a functional group into a polymer to increase interactivity with a filler when mixing a tire. However, emulsion styrene butadiene rubber synthesized by ordinary methods generates gel of ultra-high molecular weight upon reaching a conversion rate of a certain level or above since 1,3-butadiene, which is one of the monomers, has two double bonds. Accordingly, according to the conventional preparation method, after reacting up to a conversion rate of 70%, an additional process of collecting styrene and 1,3-butadiene, which are the remaining monomers, is carried out. However, in order to collect the remaining monomer of a third monomer which is used in a relatively small amount, the conventional preparation method requires an additional process and more time.

Seeded polymerization is a method for growing polymers by synthesizing polymers of small uniform microparticles, and additionally introducing monomers using the synthesized polymers as a polymerization nucleus, i.e., seed. In general, the conversion rate is to reach 100% when synthesizing seeds. This is because seeded polymerization may be affected when a reaction stopper is introduced. The advantage of a conversion rate of 100% is that it becomes easier to introduce a third monomer. When a third monomer is introduced when preparing a seed, the conversion rate reaches 100%, and thus there are no remaining monomers. However, as stated above, when the conversion rate reaches 100%, gel is generated in the seed, and the gel present in a polymer decreases workability and dispersibility with the filler, thereby causing degradation of physical properties.

The present disclosure has prepared a seed with no gel by introducing reversible addition-fragmentation chain transfer, and developed a method for polymerizing emulsion styrene butadiene rubber using the same. The conventional seeded polymerization uses tert-dodecyl mercaptan (TDDM) of a thiol group as a molecular weight controller. Since 1,3-butadiene has two double bonds, seeds prepared in a manner that the conversion rate thereof is to be reached at 100% always include gel. When a reversible addition-fragmentation chain transfer agent instead of t-dodecyl mercaptan is introduced as a molecular weight controller in order to inhibit gel generation, gel is not generated; however, the reaction time gets longer, and it is difficult for the final conversion rate to reach 50% or above.

Korean Patent Laid-Open No. 10-2012-0022623 discloses a method for preparing a conjugated diene copolymer using a trithiocarbonate chain transfer agent as a reversible addition-fragmentation chain transfer agent. However, since the conjugated diene polymer needs to be grafted after preparing a vinyl polymer, the reaction process is complex. Also, since the conversion rate is less than 50%, which is low, an additional process is required for separating and purifying monomers. In addition, since the gel content of the copolymer is high and the diameter of the particles is not uniform, it is difficult to be used as a seed.

SUMMARY OF THE DISCLOSURE

The present disclosure has been made in view of the above problems, and an aspect of the present disclosure provides a conjugated diene random copolymer with excellent fuel efficiency for having a narrow molecular weight distribution, and a method for preparing the same.

Another aspect of the present disclosure provides a conjugated diene random copolymer introducing a third monomer having a functional group, and a method for preparing the same where all the third monomer introduced is reacted.

Another aspect of the present disclosure provides method to reduce the reaction time when preparing a copolymer using a reversible addition-fragmentation chain transfer agent.

According to an aspect of the present disclosure, the present disclosure provides a composition for seeded polymerization, comprising: a seed copolymer which comprises a compound comprising dithioate, a mercaptan compound, a first aromatic vinyl monomer, and a first conjugated diene monomer, and has an average particle diameter of 10-30 nm; a second aromatic vinyl monomer; and a second conjugated diene monomer.

According to an embodiment, the seed copolymer may have a polydispersity index of particle diameter of 0.250 or less.

According to an embodiment, the seed copolymer may have a toluene-insoluble gel content of 10% or less.

According to an embodiment, the seed copolymer may comprise a matrix comprising the first aromatic vinyl monomer and the first conjugated diene monomer, and a compound comprising dithioate dispersed in the matrix.

According to an embodiment, the compound comprising dithioate may be represented by the following formulae 1 to 3:

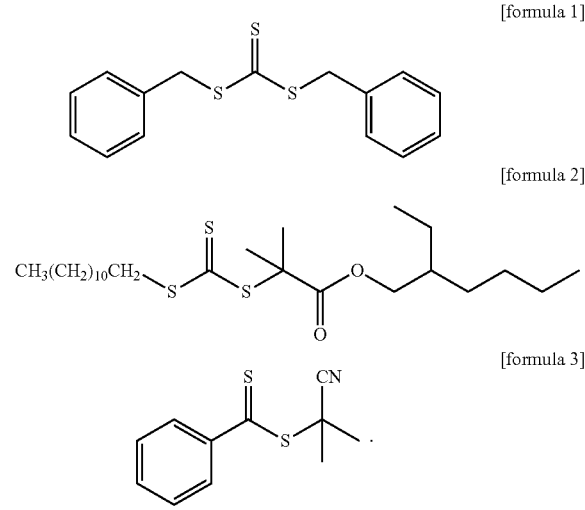

[formula 1]

[formula 2]

[formula 3]

According to an embodiment, the mercaptan compound may be n-dodecyl mercaptan.

According to an embodiment, the aromatic vinyl monomer may be selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene comprising tertiary amine, styrene comprising primary, secondary or tertiary amine, and a combination of two or more of the foregoing.

According to an embodiment, the conjugated diene monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene and a combination of two or more of the foregoing.

According to an embodiment, the seed copolymer may further comprise a monomer comprising a functional group.

According to an embodiment, the monomer comprising the functional group may be one selected from the group consisting of glycidyl methacrylate, methyl methacrylate, acrylonitrile and a combination of two or more of the foregoing.

According to another aspect of the present disclosure, the present disclosure provides a conjugated diene copolymer, which is prepared by reacting the above composition, and has a molecular weight distribution of 3 or less.

According to an embodiment, the conjugated diene copolymer may be a random copolymer.

According to another aspect of the present disclosure, the present disclosure provides a molded body comprising the above conjugated diene copolymer.

According to an embodiment, the molded body may be a tire tread.

According to another aspect of the present disclosure, the present disclosure provides a method for preparing a conjugated diene copolymer, comprising: (a) preparing a seed copolymer having an average particle diameter of 10-30 nm by reacting a compound comprising dithioate, a mercaptan compound, a first aromatic vinyl monomer and a first conjugated diene monomer; and (b) preparing a conjugated diene copolymer by reacting the seed copolymer, a mercaptan compound, a second aromatic vinyl monomer and a second conjugated diene monomer.

According to an embodiment, the mole ratio of the compound comprising dithioate and the mercaptan compound may be 1:0.5-1.5 in the step (a).

According to an embodiment, a monomer comprising a functional group may be additionally reacted in the step (a).

According to an embodiment, the conversion rate of the first aromatic vinyl monomer and the first conjugated diene monomer in the step (a) may be 70% or above.

According to an embodiment, the reaction in the steps (a) and (b) may be reversible addition-fragmentation chain transfer.

According to an embodiment, the reaction in the step (b) may be seeded polymerization.

DETAILED DESCRIPTION OF THE DISCLOSURE

Figure 1A:
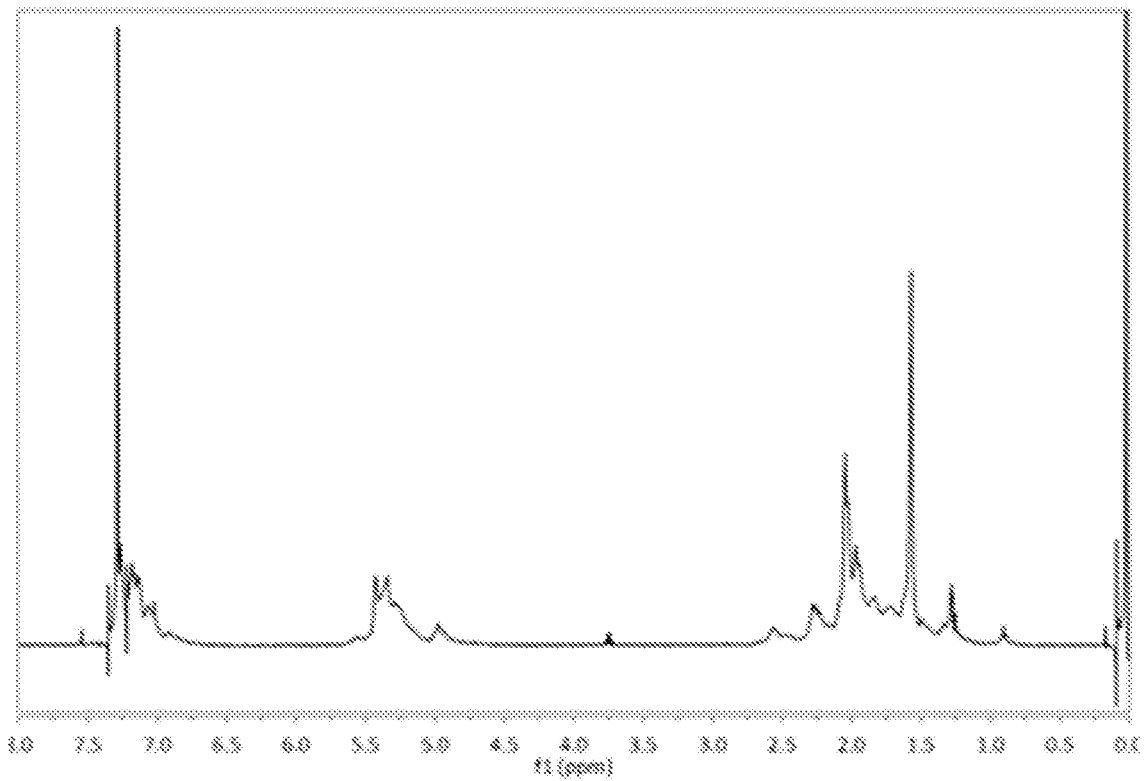
FIGS. 1(a)-(c), 2(a)-(c), 3(a)-(c), 4(a)-(c), 5(a)-(c), 6(a)-(c) and 7(a)-(c) are results analyzing the seed copolymers prepared by preparation examples 1-1 to 1-6 and comparative preparation example 1 of the present disclosure by (a) nuclear magnetic resonance, (b) gel permeation chromatography, and (c) particle sizer, respectively.

Exemplary embodiments of the present disclosure are described in detail with reference to the accompanying drawings. However, the present disclosure may be implemented in various different forms and thus is not limited to these embodiments. In the drawings, to clearly describe the present disclosure, a part not relevant to the description is omitted, and like reference numerals in the specification denote like elements.

In the specification, when it is described that a certain part is "connected" to another part, it should be understood that the certain part may be directly connected to another part or indirectly connected to another part via another member in the middle. In addition, when a certain part "includes" a certain component, this indicates that the part may further include another component instead of excluding another component unless specifically stated otherwise.

When ranges of numerical values are described in the present specification, unless otherwise stated, the numerical values have the precision of the number of significant figures provided following the standard protocol in chemistry for significant figures. For example, 10 encompasses a range from 5.0 to 14.9, whereas the number 10.0 encompasses a range from 9.50 to 10.49.

Hereinafter, embodiments of the present disclosure are described in detail with reference to the accompanying drawings.

Composition for Seeded Polymerization

A composition for seeded polymerization according to an aspect of the present disclosure may comprise: a seed copolymer which comprises a compound comprising dithioate, a mercaptan compound, a first aromatic vinyl monomer, and a first conjugated diene monomer, and has an average particle diameter of 10-30 nm; a second aromatic vinyl monomer; and a second conjugated diene monomer.

As used herein, "seeded polymerization" means a polymerization method growing particles by additionally reacting homo or hetero monomers using a pre-polymerized emulsion polymer of microparticles as a polymerization nucleus. "Composition for seeded polymerization" means a composition comprising a polymerization nucleus of microparticles, that is, a seed, required for the seeded polymerization to be used for the polymerization of conjugated diene copolymer.

In general, seeded polymerization may be carried out by using particles with a diameter of 50 nm or less, and the seeded polymerization may be carried out more stably as the seed has a smaller and more uniform particle diameter. Also, the molecular weight distribution of the polymer prepared may be narrower as the seed has a smaller and more uniform particle diameter.

The seed prepared by the conventional polymerization method has a large particle diameter, or even when the average diameter is small, the uniformity is bad. Accordingly, gel of ultra-high molecular weight or oligomer of low molecular weight is generated, thereby decreasing the stability of the seeded polymerization, and causing the property of the product to be inferior.

In comparison, the average particle diameter of the seed copolymer may be 10-30 nm, preferably 15-25 nm, and more preferably 18-22 nm. Also, the polydispersity index (PdI) of the particle diameter of the seed copolymer as measured by Malvern's particle sizer may be 0.250 or less, preferably 0.200 or less, and more preferably 0.170 or less. According to an aspect of the present disclosure, the polydispersity index may be freely controlled in the range of 0.100-0.250. Therefore, the seed copolymer has a small average particle diameter and a small deviation of particle diameter, and thus may be advantageously used for seeded polymerization.

The weight average molecular weight of the seed copolymer is 20,000-250,000 g/mol, and the toluene-insoluble gel content of the seed copolymer may be 10% or less, preferably 5% or less, and more preferably 0%. Gel content was measured according to the following method.

After precipitating the solid of the polymerized copolymer using methanol and drying the precipitated solid in an oven, 0.1 g of the solid was sufficiently dissolved in 20 ml of toluene. The solution in which the solid was dissolved was filtered using a filter paper, and then the filtrate was heated to completely evaporate toluene. Then, the weight ($W_2$) of the solid remaining was measured. The gel content was calculated by comparing the weight ($W_2$) with the weight ($W_1$) of the initial solid. The equation is as shown in the following equation 1.

$$\text{Gel Content}(\%) = \frac{W_1 - W_2}{W_1} \times 100(\%) \qquad \langle\text{Equation 1}\rangle$$

When the seed polymer is prepared by the conventional polymerization method, gel of ultra-high molecular weight may be generated at a certain conversion rate or above because the conjugated diene monomer has two or more double bonds. The gel may decrease the workability of the polymer and the dispersity with the filler, thereby degrading the physical property of the final product. In comparison, the seed copolymer has a low gel content and may solve the above problems.

The seed copolymer may comprise a matrix comprising the first aromatic vinyl monomer and the first conjugated diene monomer, and a compound comprising dithioate dispersed in the matrix.

As used herein, "matrix" means components forming a continuous phase in particles comprising two or more components. The matrix may be the seed copolymer particle copolymerizing the first aromatic vinyl monomer and the first conjugated diene monomer. The compound comprising dithioate may be present in a non-continuous phase in the matrix.

The compound comprising dithioate may be represented by the following formula 4, and may serve as a reversible addition-fragmentation chain transfer agent.

[Formula 4]

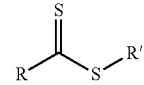

In the above formula, R and R' may have nitrogen (N), oxygen (O), and sulfur (S) atoms substituted in a $C_1$-$C_{20}$ alkyl group, an aryl group, an aralkyl group or a part of the foregoing. For example, when R or R' has nitrogen substituted in the alkyl group, it may be a nitrile group, when oxygen is substituted, it may be an alkoxy group, and when sulfur is substituted, it may be a sulfanyl group, but is not limited thereto.

Preferably, the compound comprising dithioate may be represented by the following formulae 1 to 3, and more preferably, may be a compound represented by the following formula 1.

[Formula 1]

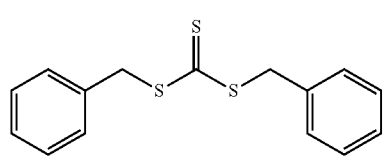

[Formula 2]

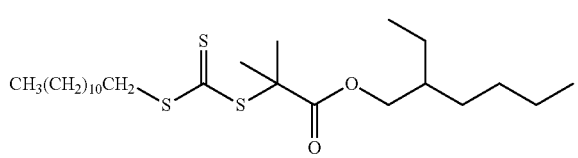

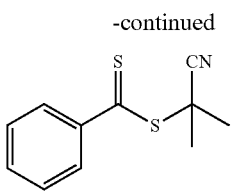

[Formula 3]

The compound comprising dithioate may be the remaining reversible addition-fragmentation chain transfer agent used for preparing the seed copolymer. Preferably, the compound comprising dithioate may be uniformly distributed in the seed copolymer particle.

The mercaptan compound refers to a compound comprising a sulfanyl group (—S—H). For example, the mercaptan compound may be ethyl-2-mercapto ethyl propionate, 2-mercapto ethyl propionate, 2-mercapto ethanol, mercapto acetic acid, n-octyl mercaptan, n-dodecyl mercaptan, t-dodecyl mercaptan, etc., and preferably n-dodecyl mercaptan, but is not limited thereto. The mercaptan compound is also the remaining chain transfer agent used for preparing the seed copolymer, and similarly, may be uniformly distributed in the seed copolymer particle.

Conventionally, thiol t-dodecyl mercaptan was used for preparing the seed polymer. However, the present disclosure prepares the seed copolymer by using a compound comprising dithioate and a mercaptan compound at the same time, and may implement high conversion rate and low gen content simultaneously.

When the seed copolymer comprises the compound comprising dithioate and the mercaptan compound, the reaction rate may be improved remarkably as compared to the conventional preparation method polymerizing by simply dispersing the chain transfer agent. When preparing a conjugated diene copolymer according to the conventional preparation method, it takes 20-25 hours. However, when preparing the copolymer using the composition according to an aspect of the present disclosure, it may only take 5-7 hours. This may be because as compared to the conventional preparation method where the chain transfer agent needs to move to the reaction point by diffusion, such diffusion is unnecessary according to the present disclosure because the surface of the seed copolymer is the reaction point.

The compound comprising dithioate and the mercaptan compound are included in a large amount when polymerizing the seed copolymer, to make the particle diameter small and uniform. Accordingly, when preparing a conjugated diene random copolymer, the copolymer may have a narrow molecular weight distribution.

The aromatic vinyl monomer may be selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene comprising tertiary amine, styrene comprising primary, secondary or tertiary amine, and a combination of two or more of the foregoing, but is not limited thereto. The first and second aromatic vinyl monomers may be the same or different. When the first and second aromatic vinyl monomers are different, a type of core-shell copolymer may be prepared.

The conjugated diene monomer may be selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene and a combination of two or more of the foregoing, but is not limited thereto. The first and second conjugated diene monomers may be the same or different. When the first and second conjugated diene monomers are different, a type of core-shell copolymer may be prepared.

The composition may further comprise a monomer comprising a functional group. For example, the monomer may be a single molecule with one functional group selected from the group of functional groups such as alcohol group, sulfide group, sulfone group, carboxyl group, amine group, aldehyde group, silane group, acryl group, etc. or may be selected from a monomer group such as vinyl pyridine, ethylene epoxide, ethylene sulfide, dialkyl amino alkyl styrene, dialkyl amino alkyl methacrylate, hexamethyl cyclotrisiloxane, etc., and preferably glycidyl methacrylate, methyl methacrylate or acrylonitrile, but is not limited thereto. The monomer comprising the functional group may function as a third monomer, thereby remarkably improving the physical property of the final product even in a small amount.

The composition may further comprise an emulsifier, a solvent and a surfactant. Any emulsifier, solvent and surfactant may be used if they are used for the conventional emulsion polymerization.

Conjugated Diene Copolymer

According to another aspect of the present disclosure, the present disclosure provides a conjugated diene copolymer which is prepared by reacting the above composition for seeded polymerization, and has a molecular weight distribution of 3 or less.

The molecular weight distribution ($M_w/M_n$) of the conjugated diene copolymer may be measured by gel chromatography. The molecular weight distribution of the conjugated diene copolymer may be 1-3. The molecular weight distribution may vary depending on the conditions of a reactor. The molecular weight distribution of the conjugated diene copolymer prepared by the conventional emulsion polymerization in the same reactor is 4.0±0.5. However, the molecular weight distribution of the conjugated diene copolymer according to an aspect of the present disclosure is remarkably improved to 3.0 or less.

The conjugated diene copolymer may be a random copolymer.

Molded Body

According to another aspect of the present disclosure, the present disclosure provides a molded body comprising the above conjugated diene copolymer, and preferably the molded body may be a tire tread.

The tire comprises the conjugated diene copolymer with a narrow molecular weight distribution, and accordingly has remarkably improved fuel efficiency, compared with the tire using a conjugated diene copolymer prepared by the conventional emulsion polymerization. When the conjugated diene copolymer comprises the monomer comprising the functional group, i.e., a third monomer, wear resistance and mechanical properties as well as fuel efficiency may be remarkably improved.

Method for Preparing Conjugated Diene Copolymer

According to another aspect of the present disclosure, the present disclosure provides a method for preparing a conjugated diene copolymer, comprising: (a) preparing a seed copolymer having an average particle diameter of 10-30 nm by reacting a compound comprising dithioate, a mercaptan compound, a first aromatic vinyl monomer and a first conjugated diene monomer; and (b) preparing a conjugated diene copolymer by reacting the seed copolymer, a mercaptan compound, a second aromatic vinyl monomer and a second conjugated diene monomer.

The types of compound comprising dithioate, mercaptan compound, aromatic vinyl monomer and conjugated diene monomer, and the effect thereof are the same as described above.

By copolymerizing a first aromatic vinyl monomer and a first conjugated diene monomer together with the compound comprising dithioate and the mercaptan compound, the preparation method may implement high conversion rate, low gel content, and small and uniform average particle diameter. Here, the mole ratio of the compound comprising dithioate and the mercaptan compound may be 0.5-1.5.

A monomer comprising a functional group may be additionally reacted in the step (a), and the type and effect thereof are the same as described above. The conversion rate of the monomer comprising the functional group may be 100%.

The method for preparing a conjugated diene copolymer using the conventional emulsion polymerization requires an additional process for collecting the remaining monomer in order to introduce a monomer comprising a functional group, i.e., third monomer, thereby raising the processing cost. However, according to the present disclosure, a seed copolymer with high conversion rate is prepared, and the monomer comprising a functional group may be introduced, without a separate collecting process, by reacting the seed copolymer and the monomer. Also, the seed copolymer has low gel content, and the particles prepared have a small and uniform average diameter, thereby ensuring high stability during seeded polymerization, and the property of the conjugated diene copolymer and the molded body prepared therefrom may be remarkably improved.

The step (a) may be carried out by continuous introduction for 12-30 hours, but is not limited thereto. The step (a) may be carried out by batch introduction, semi-batch introduction or continuous introduction which may be used for general emulsion polymerization by a person skilled in the art.

The conversion rate of the first aromatic vinyl monomer and the first conjugated diene monomer in the step (a) may be 70% or above, preferably 90% or above, and more preferably 100%.

According to the conventional method for preparing a seed copolymer, the conversion rate is less than 60% when the average particle diameter satisfies the above range, and the gel content exceeds 10% and the average particle diameter cannot be satisfied when the conversion rate satisfies 70% or above. In comparison, the seed copolymer used in the present disclosure is prepared to have a high conversion rate of 70% or above, and has a uniformly small average particle diameter and a low gel content, thereby remarkably improving the property of the conjugated diene copolymer prepared therefrom.

The reaction of the steps (a) and (b) may be reversible addition-fragmentation chain transfer. The compound comprising dithioate is a reversible addition-fragmentation chain transfer agent used in the reaction of the step (a), and as stated above, is dispersed in the seed copolymer, to also serve as a reversible addition-fragmentation chain transfer agent in the reaction of the step (b). Accordingly, the molecular weight distribution of the conjugated diene copolymer may be narrowed.

The reaction of the step (b) may be seeded polymerization. The monomer comprising the functional group may be easily introduced by using the seed copolymer prepared in the step (a), and the reaction time in the step (b) may be shortened remarkably. Also, the molecular weight distribution of the conjugated diene copolymer may be narrowed by using the seed copolymer of uniform microparticles.

Hereinafter, examples of the present disclosure are described in more detail. However, the experimental results in the following show only representative experimental results of the examples, and the scope and contents of the present disclosure cannot be construed to be reduced or limited by the examples and the like. Each effect of the various embodiments of the present disclosure not expressly set forth below will be specifically described in a relevant section.

The structure of a reversible addition-fragmentation chain transfer agent used in the examples below is illustrated by the following formulae 1 to 3.

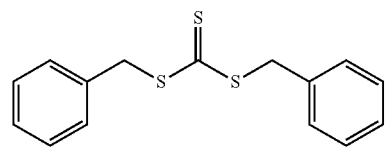

[Formula 1]

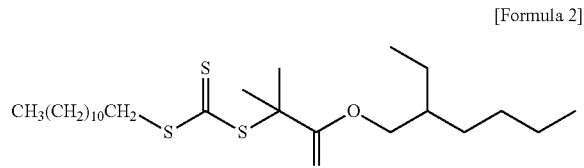

[Formula 2]

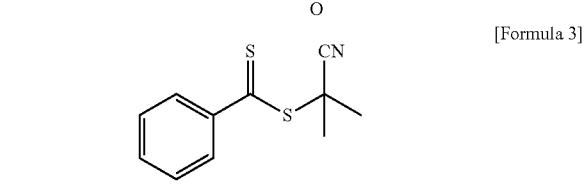

[Formula 3]

Preparation Example 1-1

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 16 hours to obtain a seed copolymer.

Preparation Example 1-2

In a 2 L pressure reactor at 10-20° C., 750 mL of water, 60 g of sodium rosin acid, 100 g of sodium fatty acid, 144 g of styrene, 180 g of 1,3-butadiene, 36 g of glycidyl methacrylate, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 17 hours to obtain a seed copolymer.

Preparation Example 1-3

In a 2 L pressure reactor at 10-20° C., 750 mL of water, 60 g of sodium rosin acid, 100 g of sodium fatty acid, 144 g of styrene, 180 g of 1,3-butadiene, 36 g of acrylonitrile, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 17 hours to obtain a seed copolymer.

Preparation Example 1-4

In a 2 L pressure reactor at 10-20° C., 750 mL of water, 60 g of sodium rosin acid, 100 g of sodium fatty acid, 144 g of styrene, 180 g of 1,3-butadiene, 36 g of methyl methacrylate, 0.8 g of methane hydroperoxide, 0.09 g of EDTA, 0.04 g of ferrous sulfate, 0.2 g of sodium hydrosulfate, 1.4 g of the compound of formula 1, and 1.1 g of n-dodecyl mercaptan were continuously introduced and stirred for 17 hours to obtain a seed copolymer.

Preparation Example 1-5

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 2.3 g of the compound of formula 2, and 1.1 g of n-dodecyl mercaptan were continuously introduced and stirred for 20 hours to obtain a seed copolymer.

Preparation Example 1-6

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, 1.1 g of the compound of formula 3, and 1.1 g of n-dodecyl mercaptan were continuously introduced and stirred for 20 hours to obtain a seed copolymer.

Comparative Preparation Example 1

In a 2 L pressure reactor at 10-20° C., 750 mL of water, 60 g of sodium rosin acid, 100 g of sodium fatty acid, 180 g of styrene, 180 g of 1,3-butadiene, 0.8 g of methane hydroperoxide, 0.09 g of EDTA, 0.04 g of ferrous sulfate, 0.2 g of sodium hydrosulfate, and 2.1 g of n-dodecyl mercaptan were continuously introduced and stirred for 16 hours to obtain a seed copolymer.

Example 1

In a 1 L pressure reactor at 7° C., 390 mL of water, 2.8 g of sodium rosin acid, 8.4 g of sodium fatty acid, 60 g of styrene, 160 g of 1,3-butadiene, 100 g of the seed copolymer in preparation example 1-1, 0.3 g of methane hydroperoxide, 0.06 g of EDTA, 0.02 g of ferrous sulfate, 0.1 g of sodium hydrosulfate, and 0.2 g of n-dodecyl mercaptan were continuously introduced and stirred for 6 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer (yield 72%).

Example 2

In a 1 L pressure reactor at 7° C., 390 mL of water, 2.8 g of sodium rosin acid, 8.4 g of sodium fatty acid, 60 g of styrene, 160 g of 1,3-butadiene, 100 g of the seed copolymer in preparation example 1-2, 0.3 g of methane hydroperoxide, 0.06 g of EDTA, 0.02 g of ferrous sulfate, 0.1 g of sodium hydrosulfate, and 0.2 g of n-dodecyl mercaptan were continuously introduced and stirred for 6 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer (yield 71%).

Example 3

In a 1 L pressure reactor at 7° C., 390 mL of water, 2.8 g of sodium rosin acid, 8.4 g of sodium fatty acid, 60 g of styrene, 160 g of 1,3-butadiene, 100 g of the seed copolymer in preparation example 1-3, 0.3 g of methane hydroperoxide, 0.06 g of EDTA, 0.02 g of ferrous sulfate, 0.1 g of sodium hydrosulfate, and 0.2 g of n-dodecyl mercaptan were continuously introduced and stirred for 6 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer (yield 70%).

Example 4

In a 1 L pressure reactor at 7° C., 390 mL of water, 2.8 g of sodium rosin acid, 8.4 g of sodium fatty acid, 60 g of styrene, 160 g of 1,3-butadiene, 100 g of the seed copolymer in preparation example 1-4, 0.3 g of methane hydroperoxide, 0.06 g of EDTA, 0.02 g of ferrous sulfate, 0.1 g of sodium hydrosulfate, and 0.2 g of n-dodecyl mercaptan were continuously introduced and stirred for 6 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer (yield 73%).

Comparative Example 1

In a 1 L pressure reactor at 7° C., 390 mL of water, 2.8 g of sodium rosin acid, 8.4 g of sodium fatty acid, 60 g of styrene, 160 g of 1,3-butadiene, 100 g of the seed copolymer in comparative preparation example 1, 0.3 g of methane hydroperoxide, 0.06 g of EDTA, 0.02 g of ferrous sulfate, 0.1 g of sodium hydrosulfate, and 0.2 g of n-dodecyl mercaptan were continuously introduced and stirred for 6 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer.

Comparative Example 2

In a 1 L pressure reactor at 7° C., 390 mL of water, 14.5 g of sodium rosin acid, 42.1 g of sodium fatty acid, 70 g of styrene, 180 g of 1,3-butadiene, 0.3 g of methane hydroperoxide, 0.06 g of EDTA, 0.02 g of ferrous sulfate, 0.1 g of sodium hydrosulfate, and 0.5 g of n-dodecyl mercaptan were continuously introduced and stirred for 8 hours. 0.2 g of diethylhydroxyamine was introduced to terminate the reaction. After carrying out a stripping process to remove unreacted monomers, 20 g of 20% sulfuric acid aqueous solution, and 20 g of 25% sodium chloride were introduced for latex coagulation to obtain a conjugated diene random copolymer (yield 70%).

The reaction time of the method for preparing the conjugated diene random copolymer in examples 1 to 4 is 5-7 hours, and accordingly the reaction time can be reduced by about at least three times as compared to the reaction time of 20-25 hours for the conventional method for preparing a copolymer using a reversible addition-fragmentation chain transfer agent.

Preparation Example 2 and Comparative Preparation Example 2

In a closed mixer (Banbury mixer), 80 g of the copolymer prepared in examples 1 to 4 and comparative examples 1 and 2, 20 g of polybutadiene rubber (Kumho Petrochemical Co., Ltd. KBR-01), 3 g of zinc oxide, 2 g of stearic acid, 80 g of carbon black (Corax™ N234), 6.4 g of 3-triethoxy silylpropyl tetrasulfide, and 1 g of N-(1,3-dimethyl)-N'-phenyl-p-phenylene diamine were sequentially added. First mixing was carried out by mixing for 10 minutes under conditions of 60° C. and 60 rpm. After cooling the processing temperature to 50° C., and introducing 2.2 g of sulfur and 2.8 g of N-cyclohexyl-2-benzothiazyl sulfonamide, the mixture was stirred and mixed for 3 minutes at a rate of 50 rpm at 60° C. to obtain a second mixture. After processing the second mixture into a flat sheet form on a 1.2 mm thick roll, the second mixture was left to stand for 24 hours. The second mixture was pressurized for 10 minutes at a pressure of 160 kgf/cm$^2$ or above on a hot press at 160° C. to prepare a 2 mm thick sheet.

Experimental Example 1

In order to confirm the properties of the seed copolymer prepared in preparation example 1 and comparative preparation example 1, nuclear magnetic resonance (NMR), gel permeation chromatography (GPC), a particle sizer and gel-content experiments are used for analysis, and the results are shown in tables 1 and 2 below.

Nuclear magnetic resonance (NMR): After precipitating the solid of the polymerized copolymer using methanol and drying the precipitated solid in an oven, 10 mg of the solid was sufficiently dissolved in 10 ml of deuterated chloroform (CDCl$_3$). A part thereof was moved to an NMR tube to be measured under a condition of 400 MHz using the L-65 model of Bruker.

Gel permeation chromatography (GPC): After precipitating the solid of the polymerized copolymer using methanol and drying the precipitated solid in an oven, 10 mg of the solid was sufficiently dissolved in 10 ml of tetrahydrofuran (THF). 1.5 ml thereof was moved to a GPC vial to be measured for 40 minutes using the e9625 model of Waters.

Particle sizer: After sufficiently shaking 0.5 g of the polymerized copolymer in 10 ml of distilled water, a part thereof was moved to a particle sizer cell to be measured using the Zen3660 model of Malvern.

Gel content measurement: After precipitating the solid of the polymerized copolymer using methanol and drying the precipitated solid in an oven, 0.1 g of the solid was sufficiently dissolved in 20 ml of toluene. The solution in which the solid was dissolved was filtered using a filter paper, and then the filtrate was heated to completely evaporate the toluene. Then, the weight (W$_2$) of the solid remaining was measured. The gel content was calculated by comparing the weight (W$_2$) with the weight (W$_1$) of the initial solid. The equation is as shown in the following equation 1.

$$\text{Gel Content}(\%) = \frac{W_1 - W_2}{W_1} \times 100(\%) \quad \langle\text{Equation 1}\rangle$$

TABLE 1

Figure 1B:
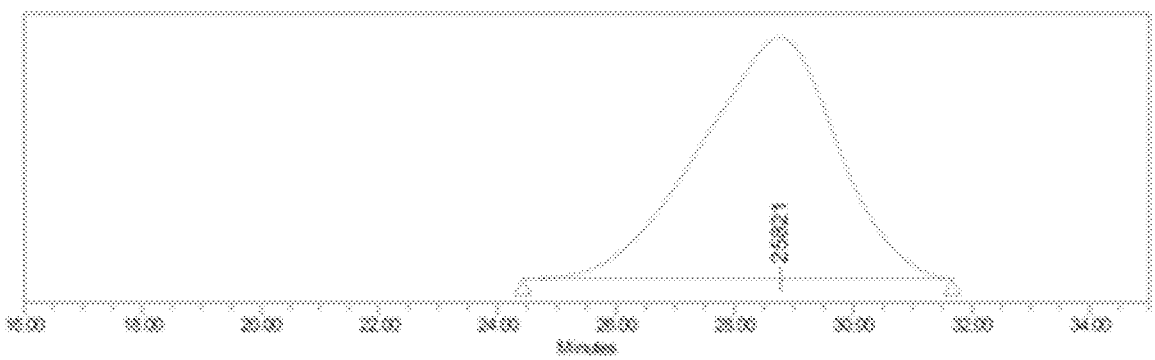
Figure 1C:
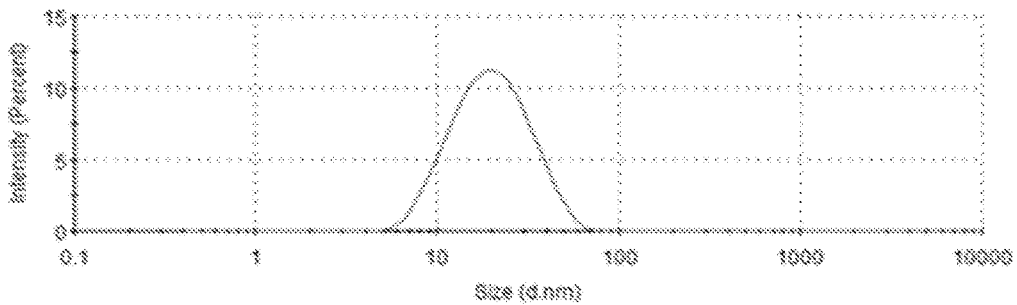
Figure 2A:
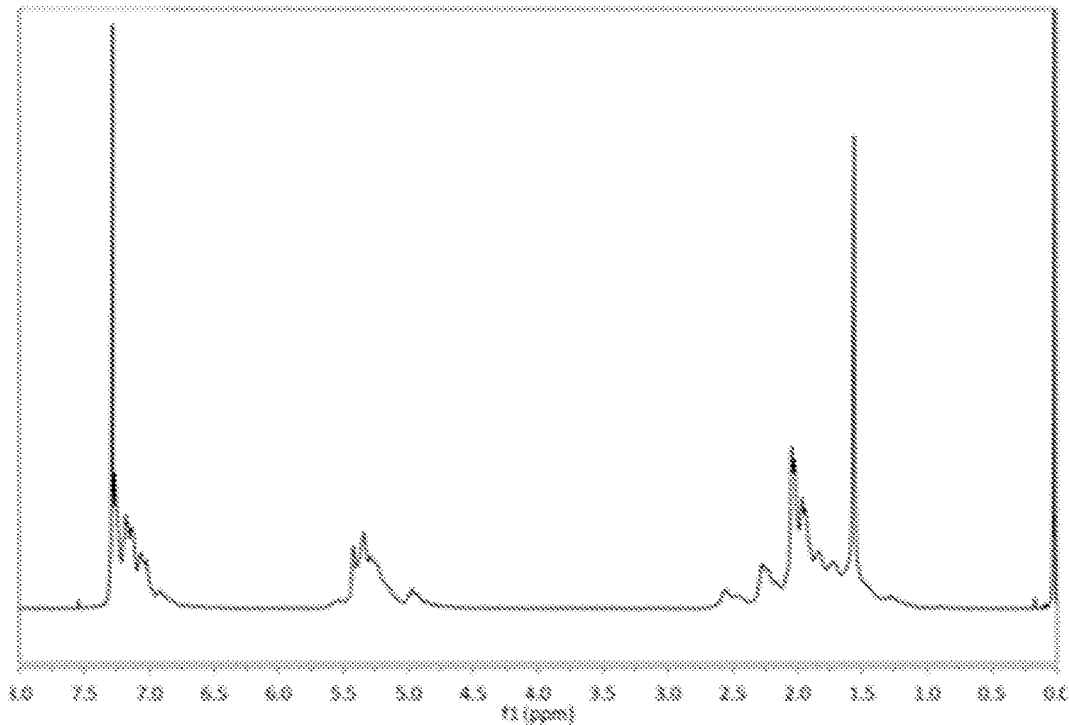
Figure 2B:
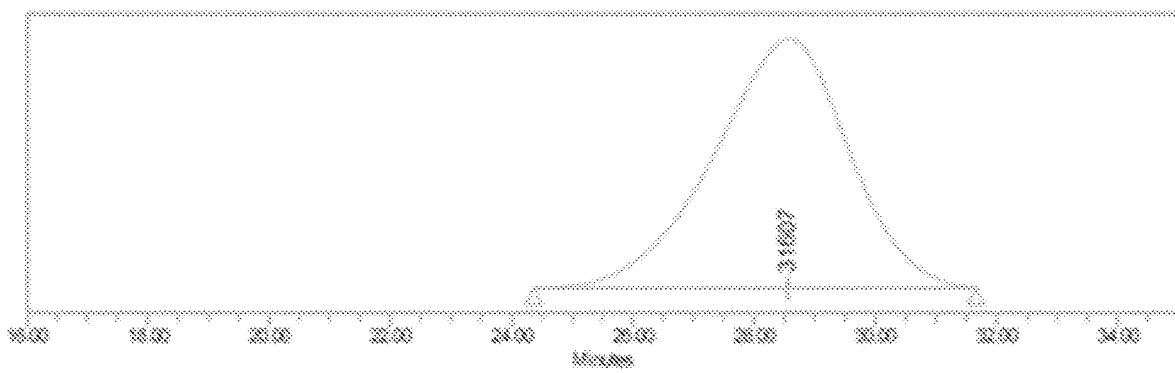
Figure 2C:
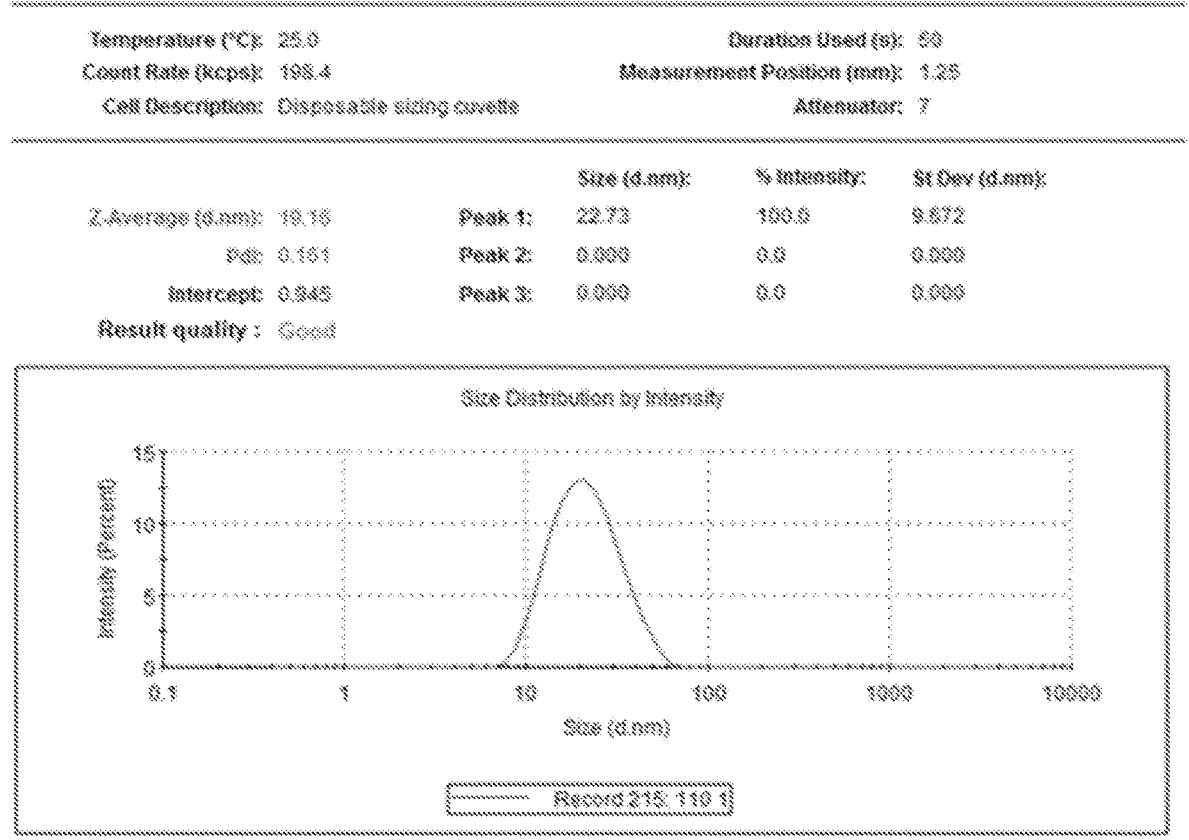
Figure 3A:
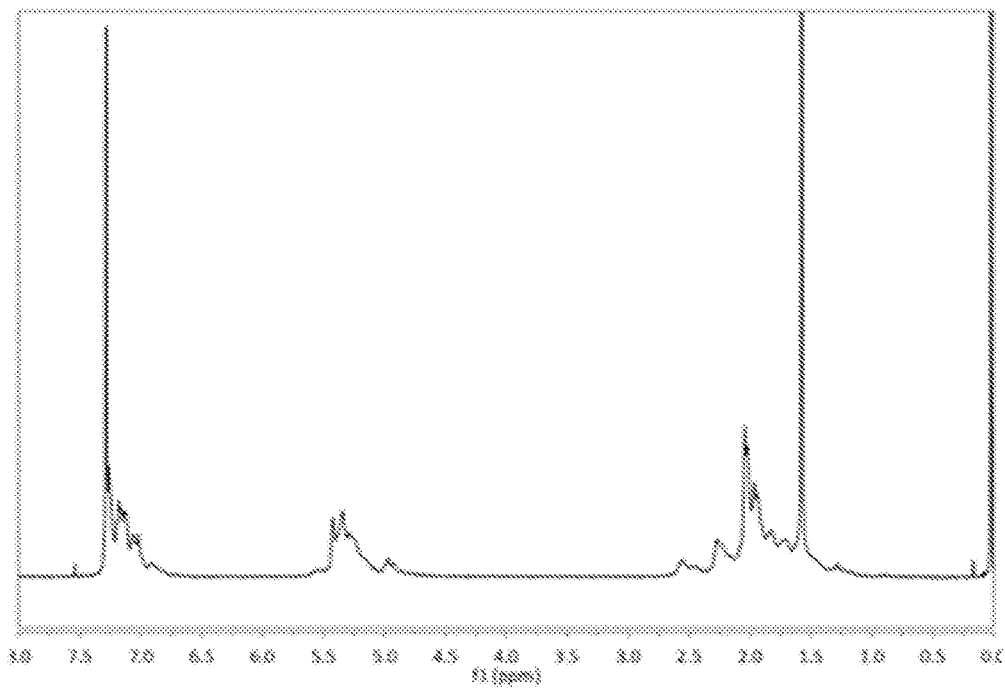
Figure 3B:
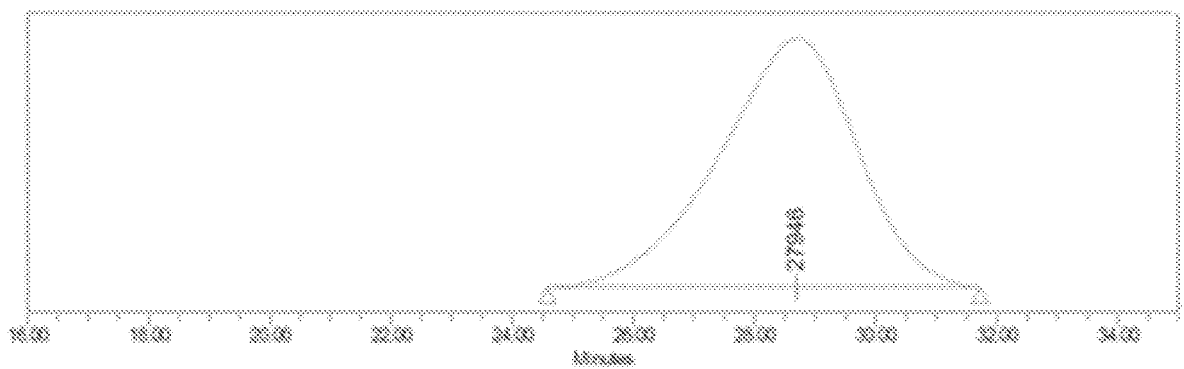
Figure 3C:
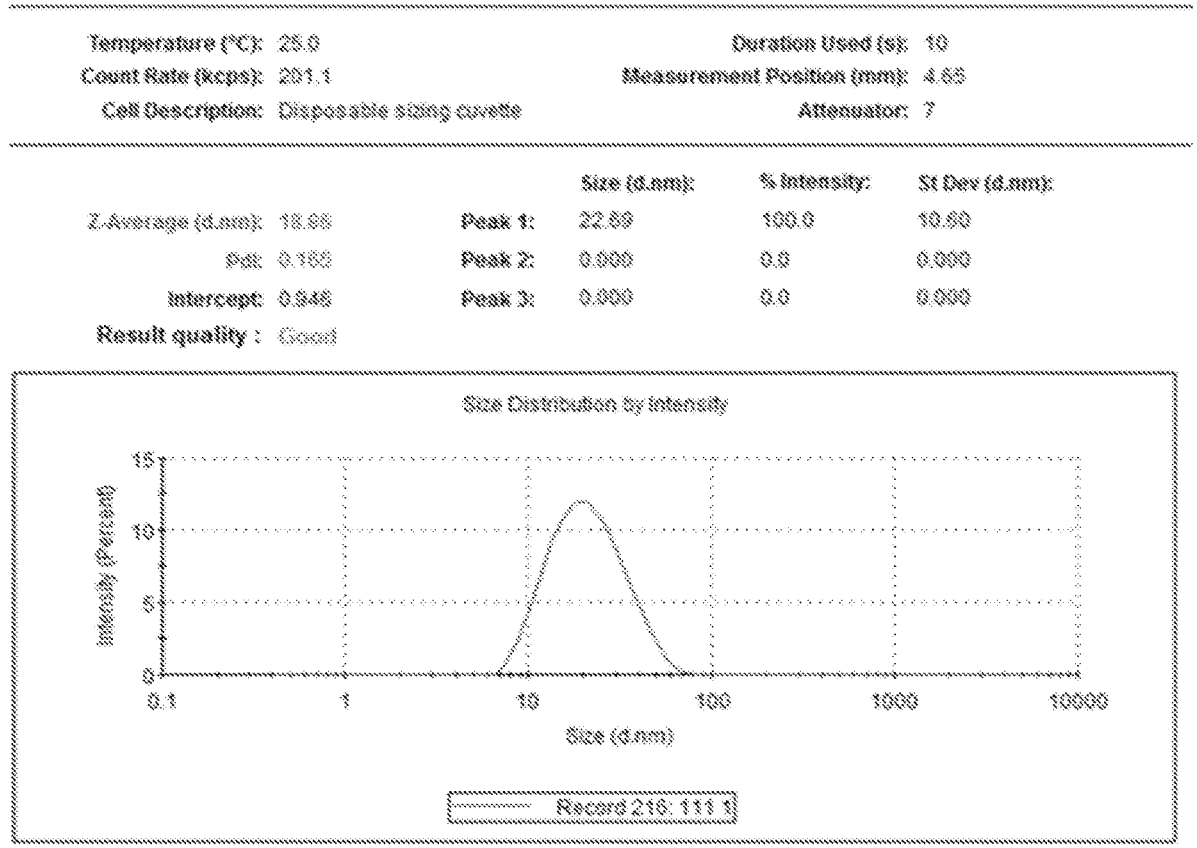
Figure 4A:
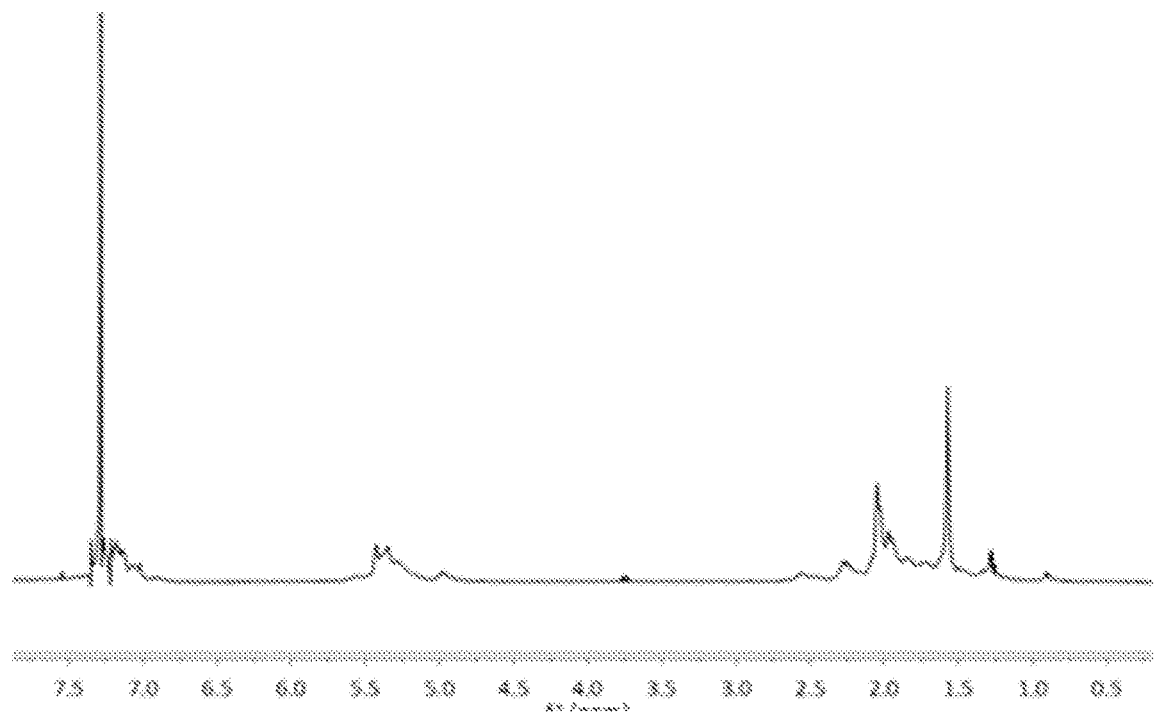
Figure 4B:
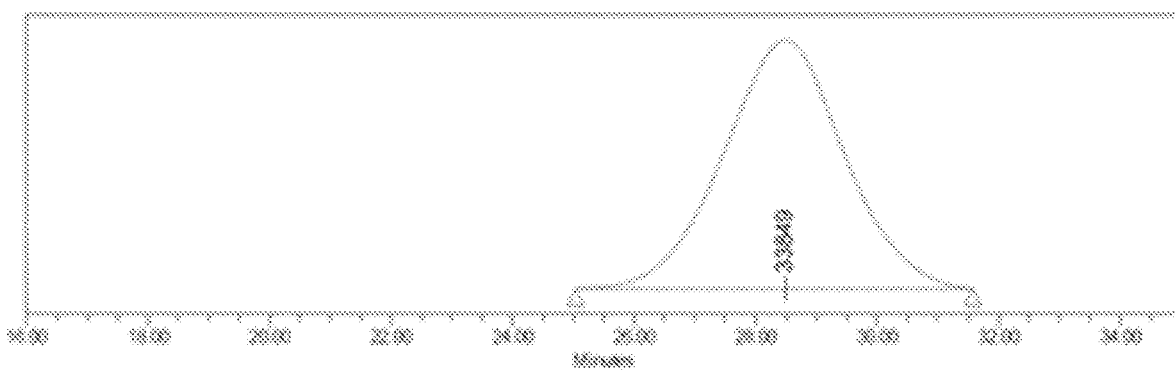
Figure 4C:
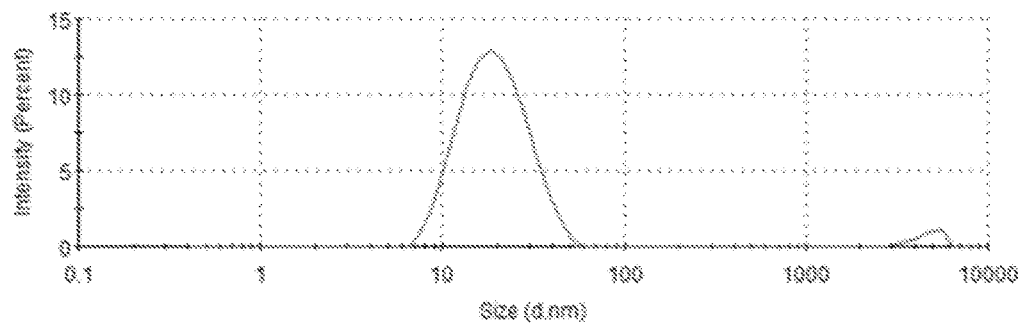
Figure 5A:
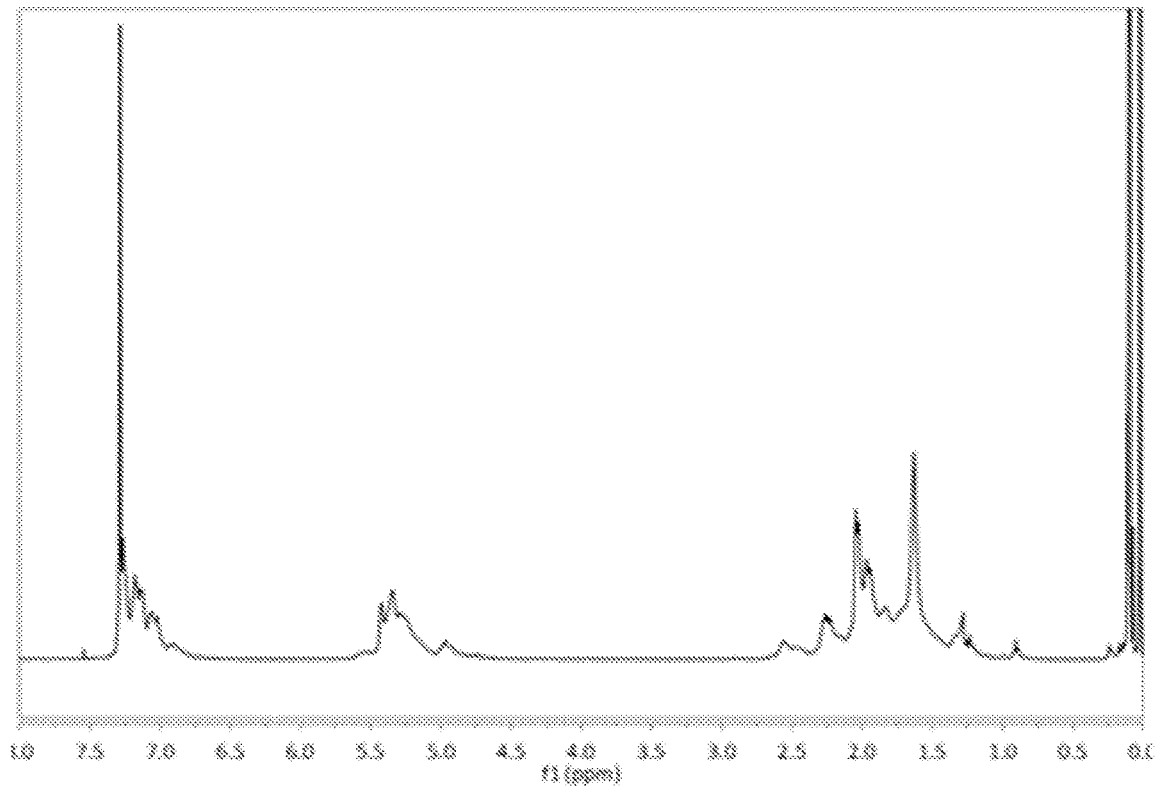
Figure 5B:
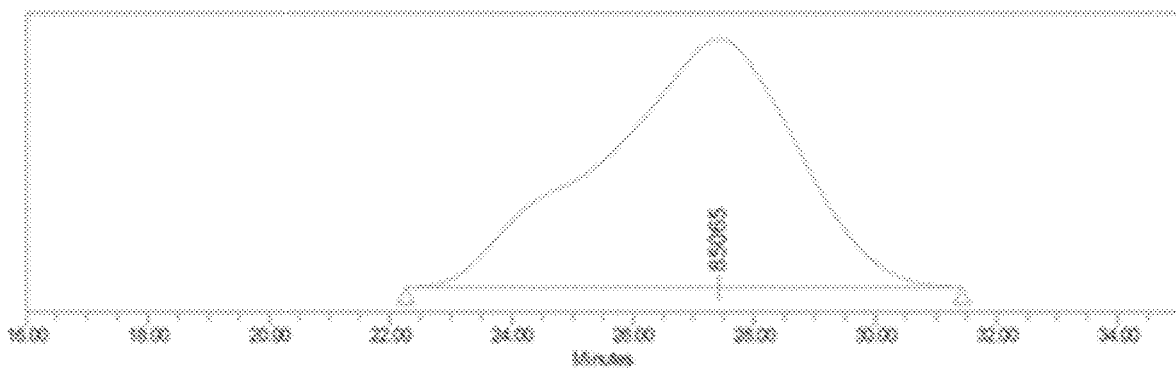
Figure 5C:
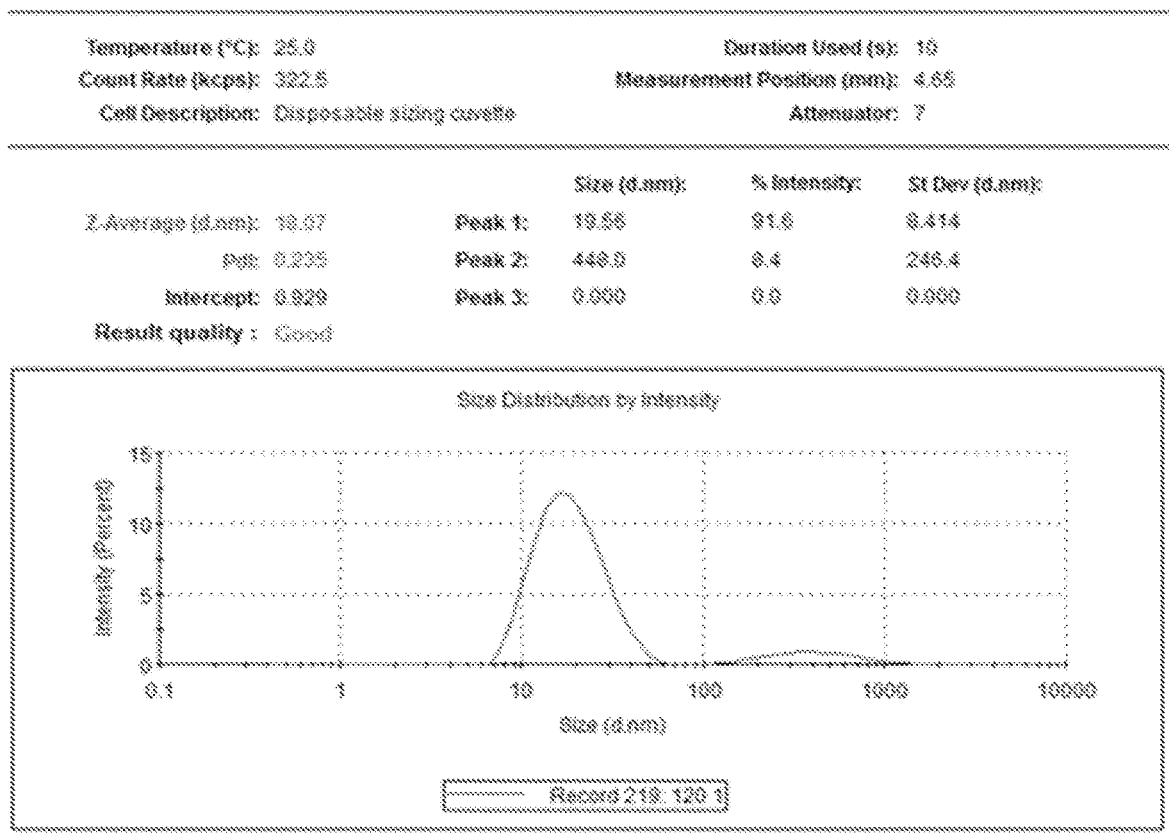
Figure 6A:
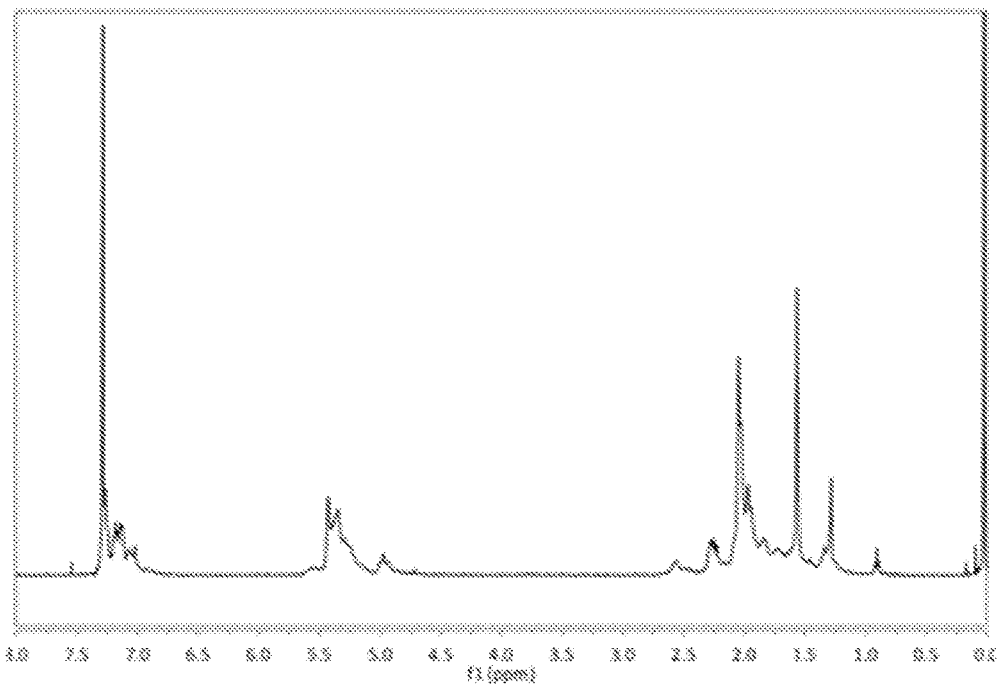
Figure 6B:
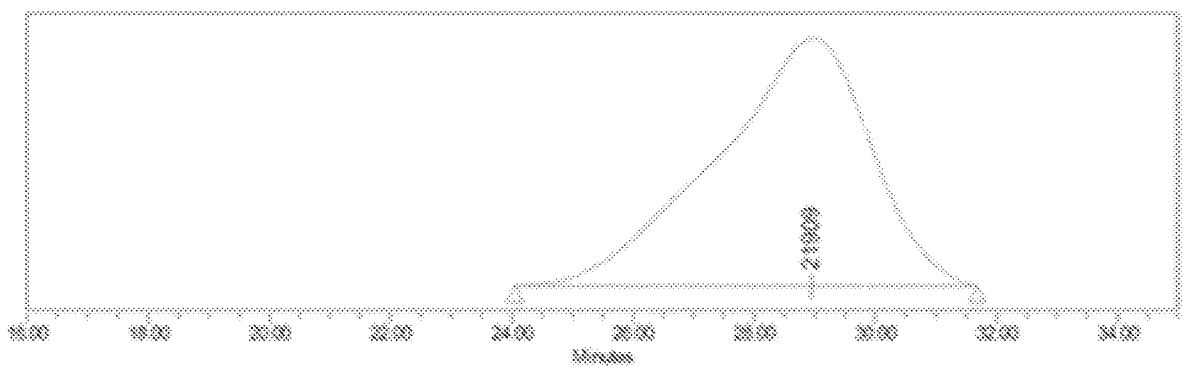
Figure 6C:
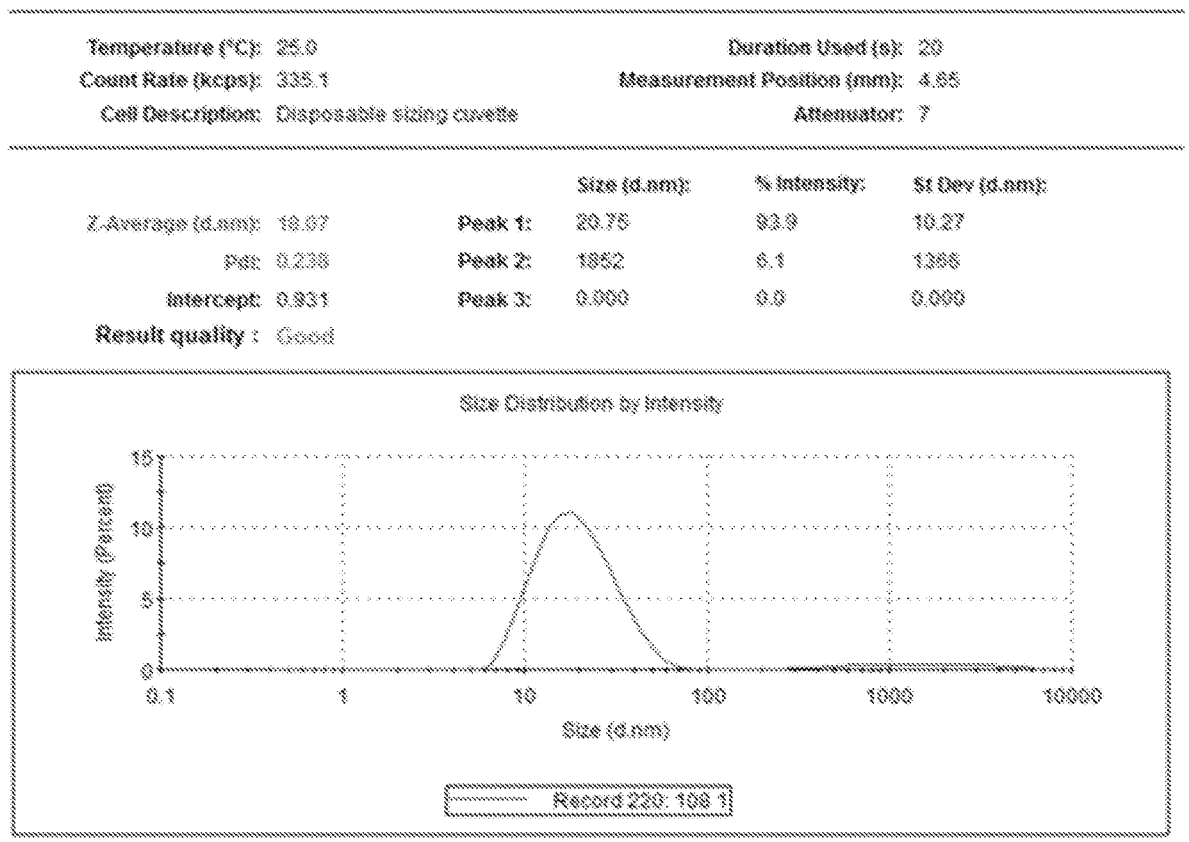
Figure 7A:
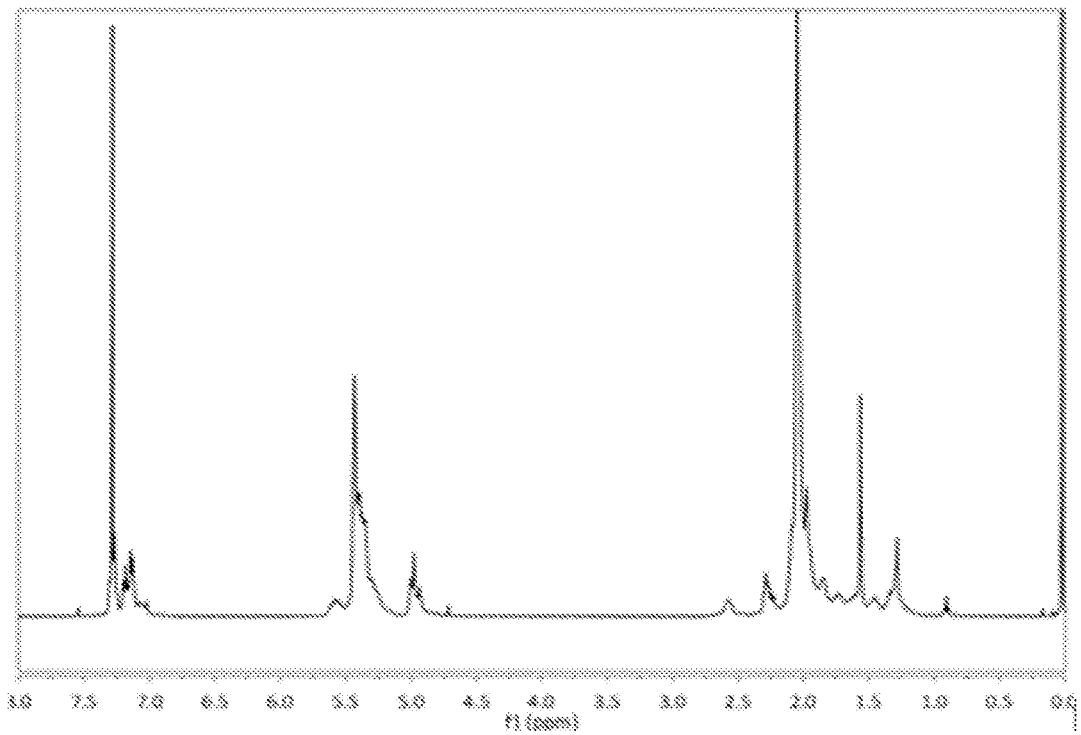
Figure 7B:
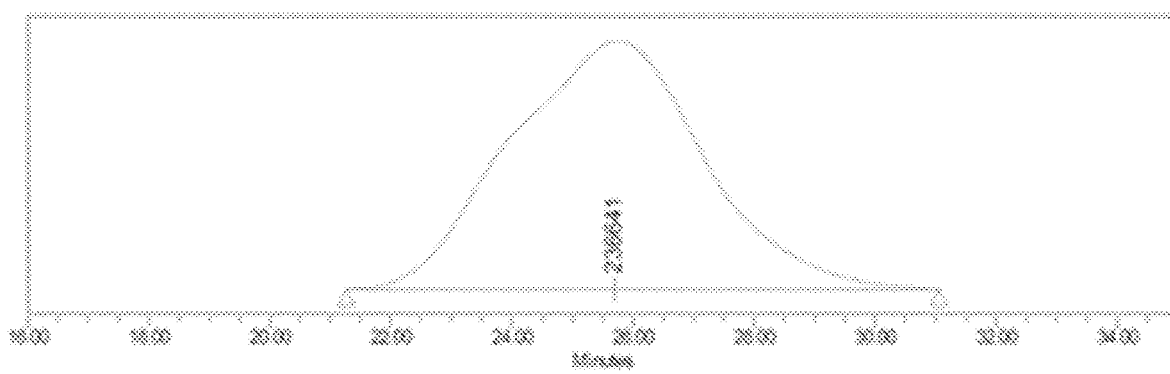
Figure 7C:
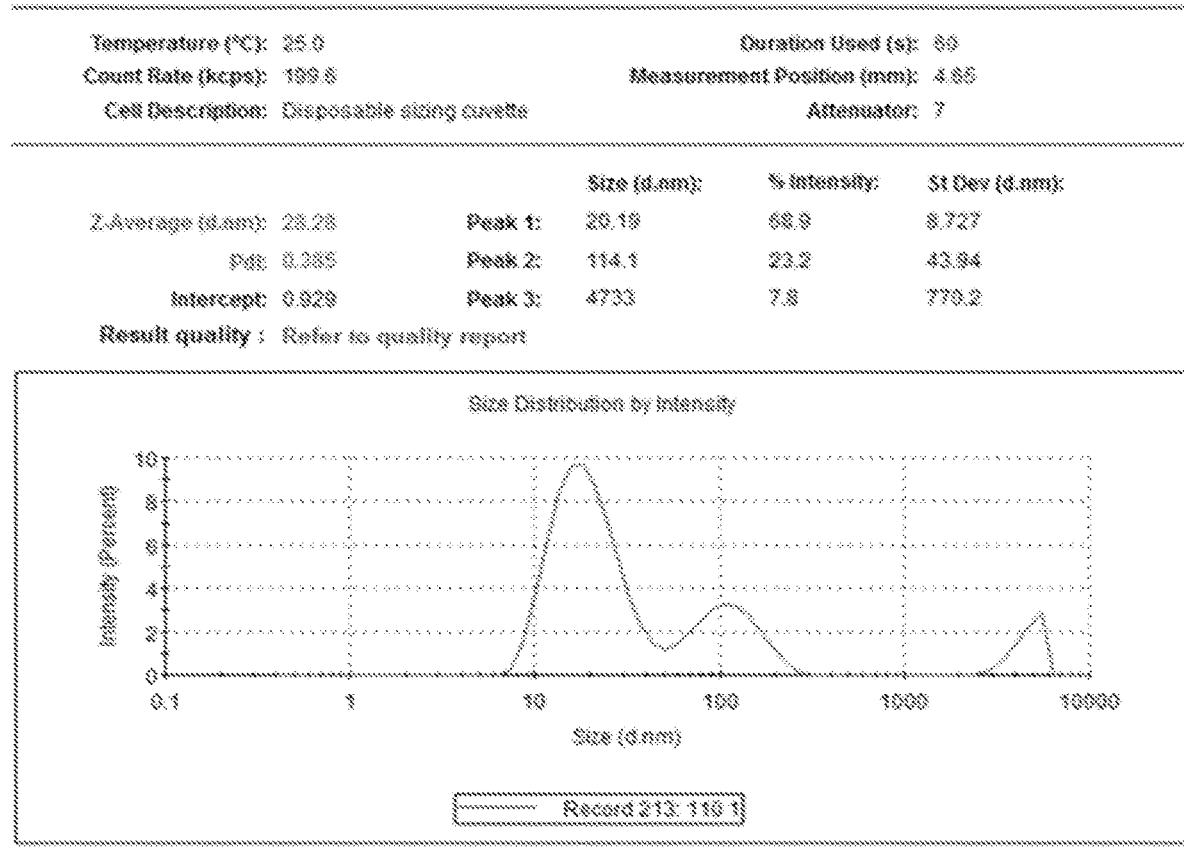

|  | NMR | GPC | Particle sizer |
|---|---|---|---|
| Preparation example 1-1 | FIG.1(a) | FIG.1(b) | FIG.1(c) |
| Preparation example 1-2 | FIG.2(a) | FIG.2(b) | FIG.2(c) |
| Preparation example 1-3 | FIG.3(a) | FIG.3(b) | FIG.3(c) |
| Preparation example 1-4 | FIG.4(a) | FIG.4(b) | FIG.4(c) |
| Preparation example 1-5 | FIG.5(a) | FIG.5(b) | FIG.5(c) |
| Preparation example 1-6 | FIG.6(a) | FIG.6(b) | FIG.6(c) |
| Comparative preparation example 1 | FIG.7(a) | FIG.7(b) | FIG.7(c) |

TABLE 2

|  | Molecular weight (g/mol) | Gel content (%) | Average particle diameter (nm) | Conversion rate (%) |
|---|---|---|---|---|
| Preparation example 1-1 | 51,715 | 0 | 17.47 | 100.0 |
| Preparation example 1-2 | 54,926 | 0 | 19.16 | 100.0 |
| Preparation example 1-3 | 52,145 | 0 | 18.86 | 100.0 |
| Preparation example 1-4 | 46,560 | 0 | 18.71 | 100.0 |
| Preparation example 1-5 | 237,582 | 3.2 | 18.07 | 100.0 |
| Preparation example 1-6 | 61,046 | 2.8 | 18.07 | 100.0 |
| Comparative preparation example 1 | 394,929 | 19.2 | 28.28 | 100.0 |

Referring to table 2 above, it is confirmed that preparation examples 1-1 to 1-4, which use the compound of formula 1 and n-dodecyl mercaptan together, prepare a copolymer having an average particle diameter between 17.47 nm and 19.16 nm, while implementing a conversion rate of 100% and simultaneously controlling the gel content to be 0%, and thus they are advantageous for seeded polymerization. In particular, the seed copolymer in preparation example 1-1 has a gel content of 0% at a conversion rate of 100%, and thus has excellent workability and dispersibility with the filler during the seeded polymerization of a conjugated diene random copolymer using the same.

Also, preparation examples 1-2 to 1-4, which introduce glycidyl methacrylate, acrylonitrile, and methyl methacrylate as a third monomer, also maintain a gel content of 0% at a conversion rate of 100%, and prepare a copolymer having a small and uniform average particle diameter within 19 nm. Thus, they are advantageous for seeded polymerization, and the third monomer could improve physical properties of the final product.

In comparison, comparative example 1, which uses n-dodecyl mercaptan alone, has an average particle diameter of 28.28 nm and a gel content of 19.2% which is high, thereby causing the property of the rubber prepared to be inferior when applied to seeded polymerization. An additional experiment was carried out extending the reaction time in comparative example 1 to 24 hours, but the gel content exceeded 30%, and thus the copolymer could not be used as a seed.

When referring to FIGS. 1 to 6, the seed copolymers in preparation examples 1-1 to 1-4 have a polydispersity index of less than 0.230 which is remarkably excellent as compared to 0.385 in comparative preparation example 1. In particular, the seed copolymers in preparation examples 1-2 to 1-3 have a more uniform particle diameter of 0.160 and 0.170.

Experimental Example 2

In order to confirm the properties of the conjugated diene random copolymers prepared in the examples and comparative examples above, nuclear magnetic resonance (NMR)

and gel permeation chromatography (GPC) are used for analysis, and the results are shown in tables 3 and 4 below.

TABLE 3

Figure 8A:
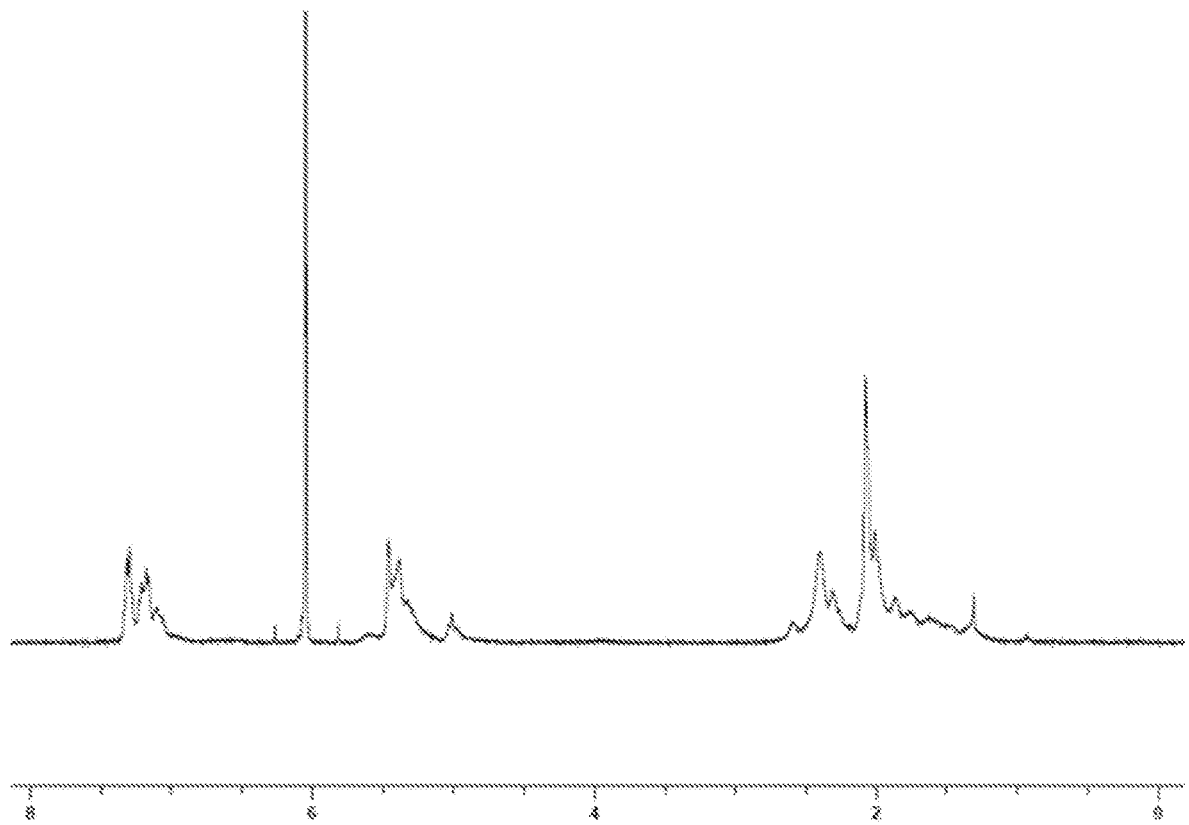
FIGS. 8(a), 8(b), 9(a), 9(b), 10(a), 10(b), 11(a), 11(b), 12(a), 12(b), 13(a) and 13(b) are results analyzing the random conjugated diene copolymers prepared by examples 1 to 4 and comparative examples 1 and 2 of the present disclosure by (a) nuclear magnetic resonance and (b) gel permeation chromatography, respectively.
Figure 8B:
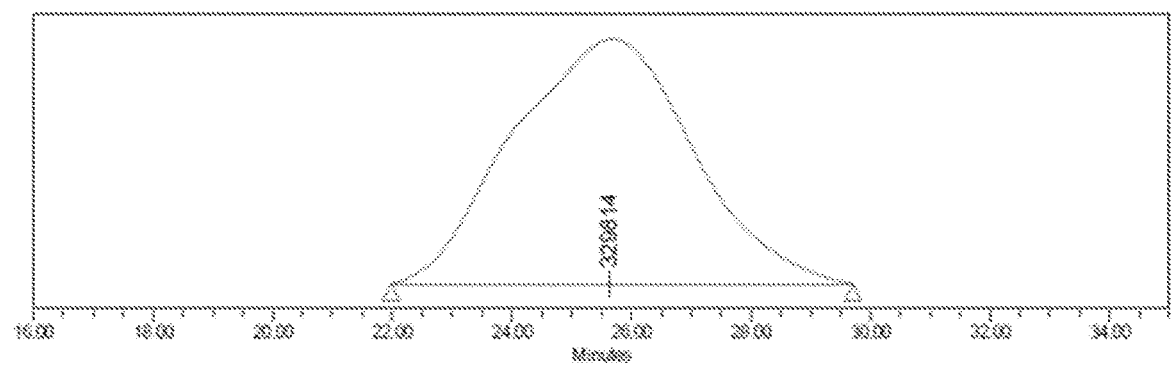
Figure 9A:
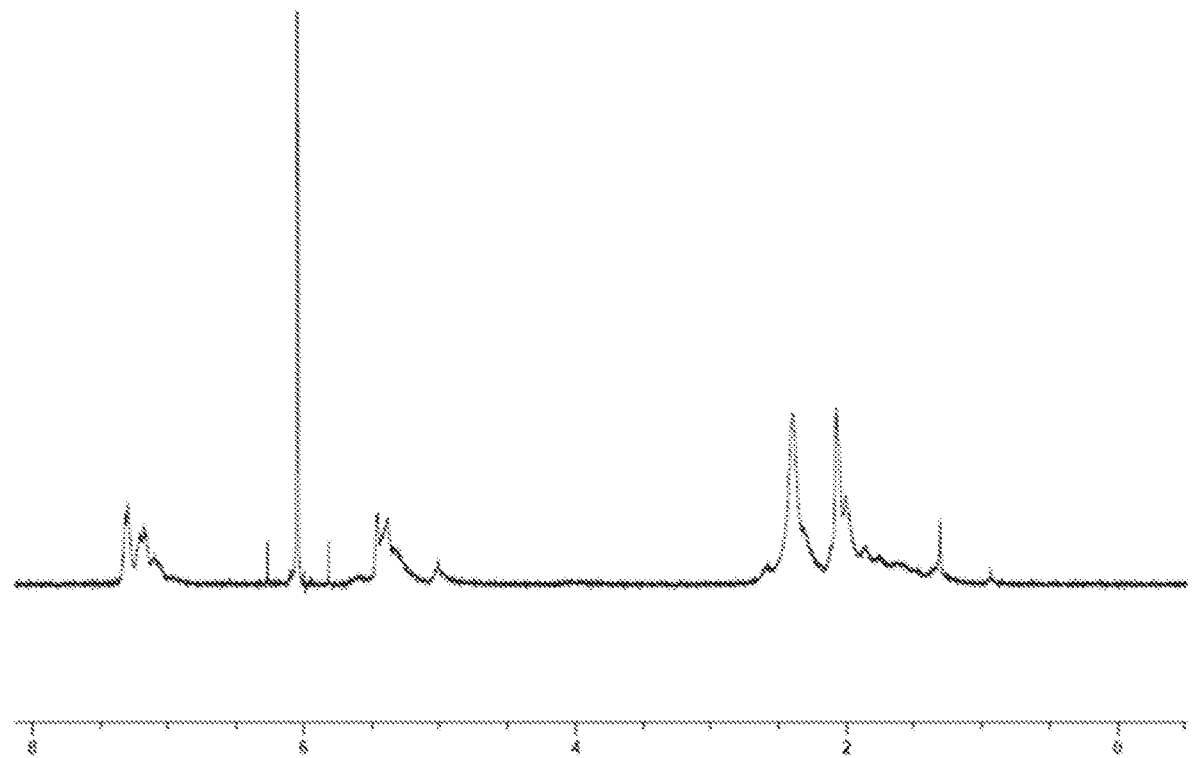
Figure 9B:
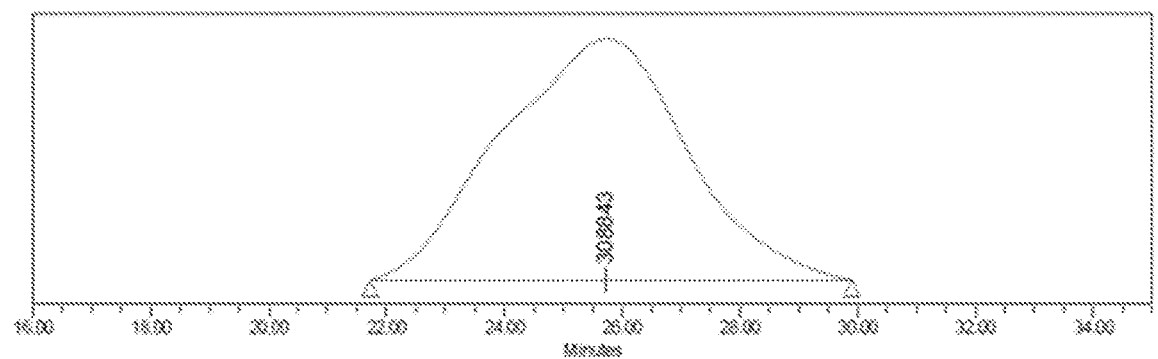
Figure 10A:
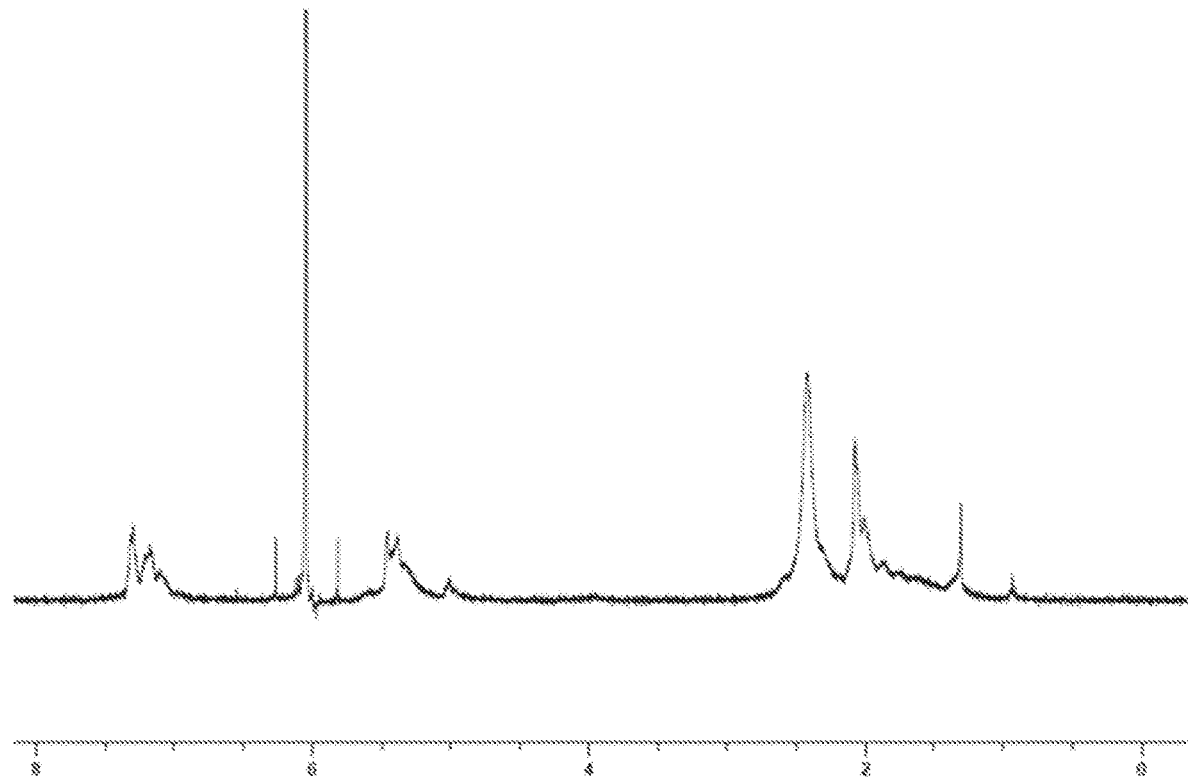
Figure 10B:
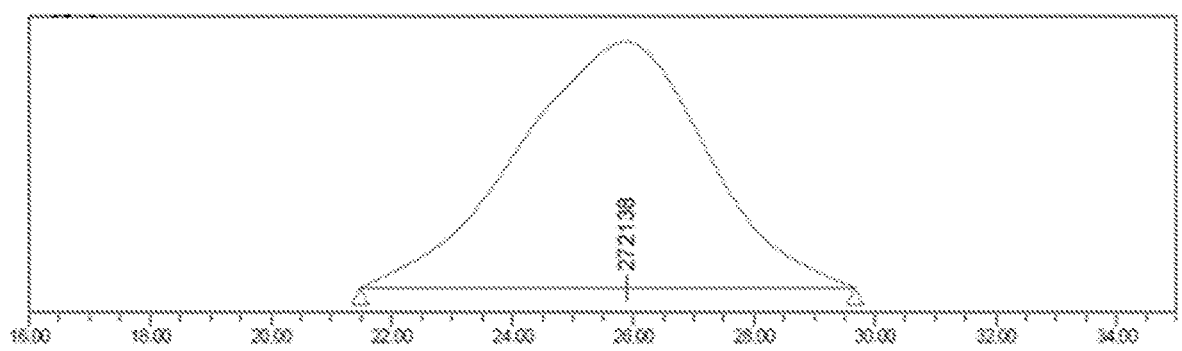
Figure 11A:
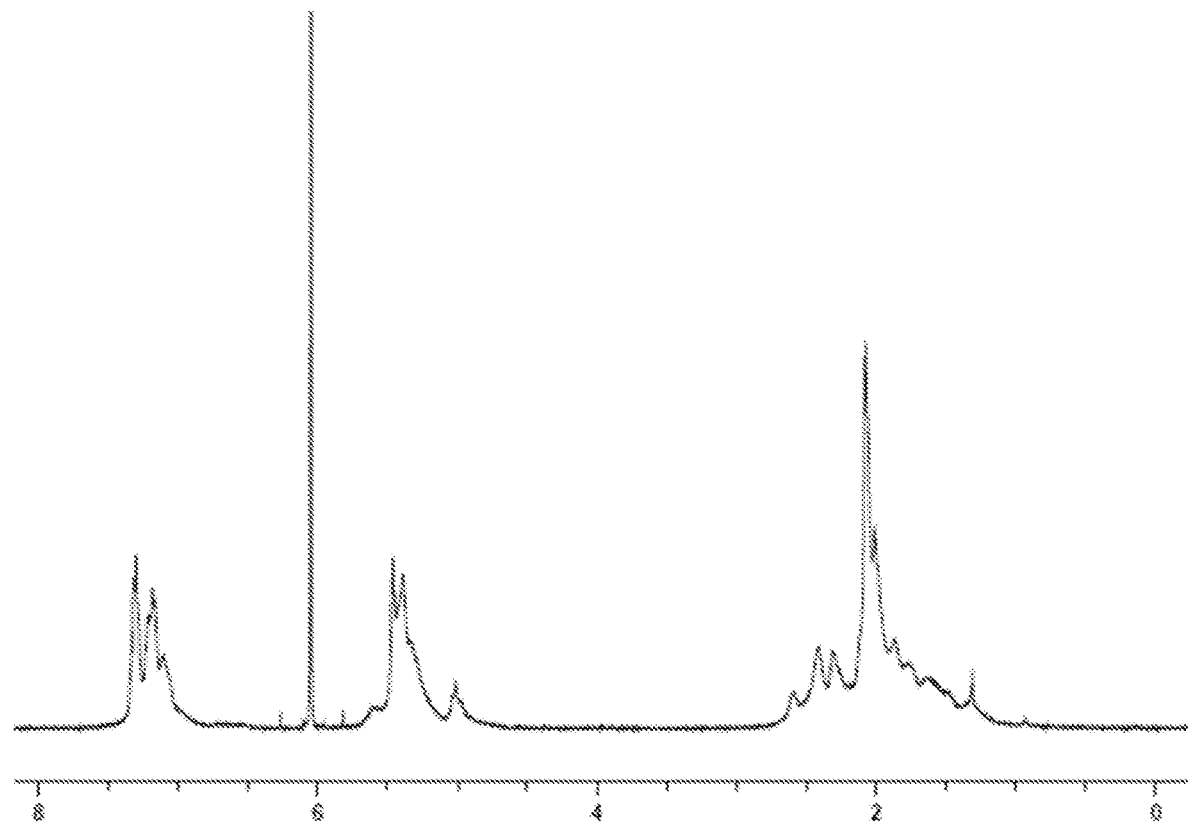
Figure 11B:
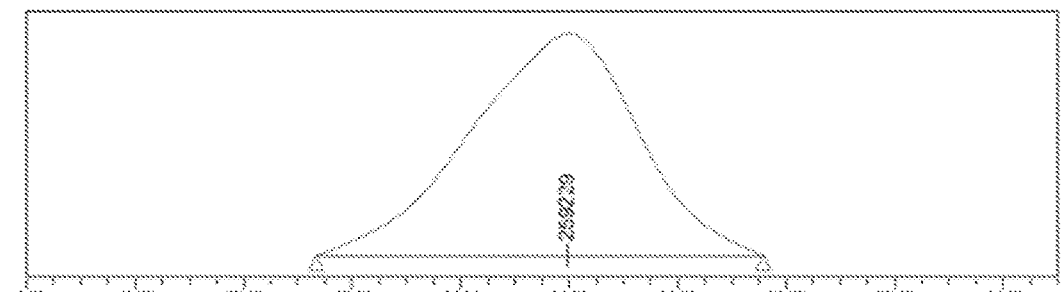
Figure 12A:
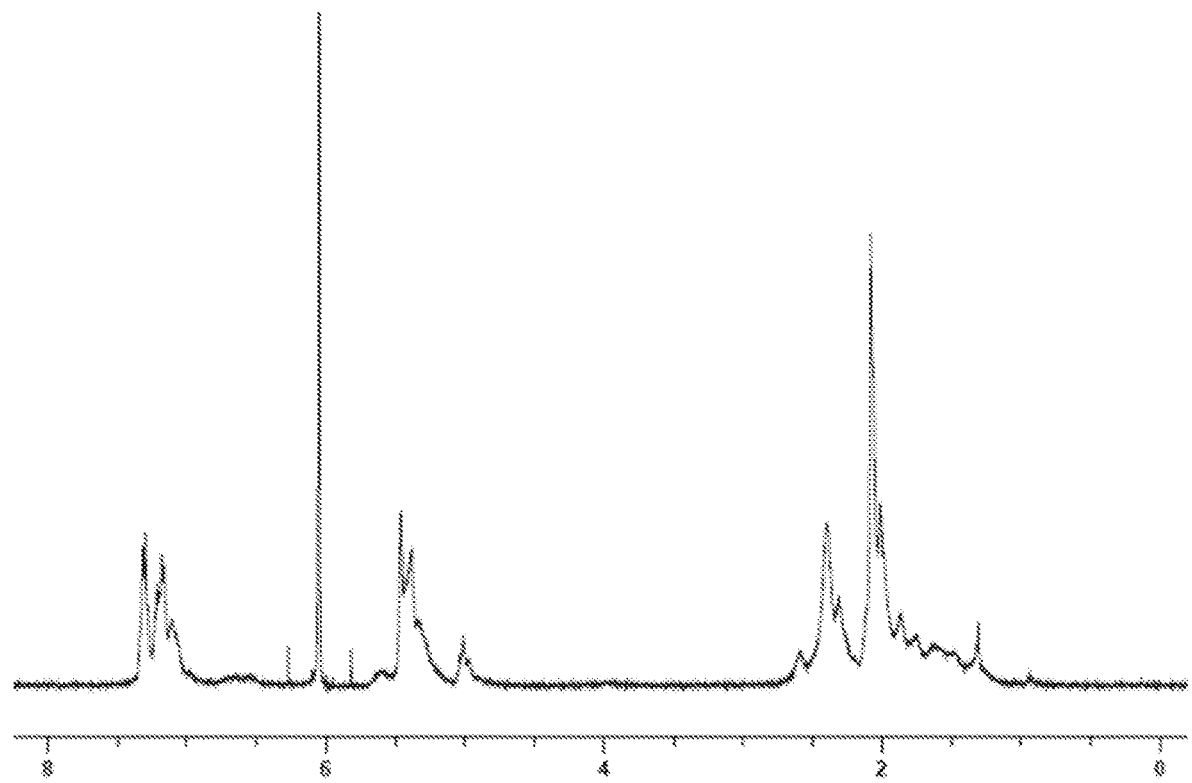
Figure 12B:
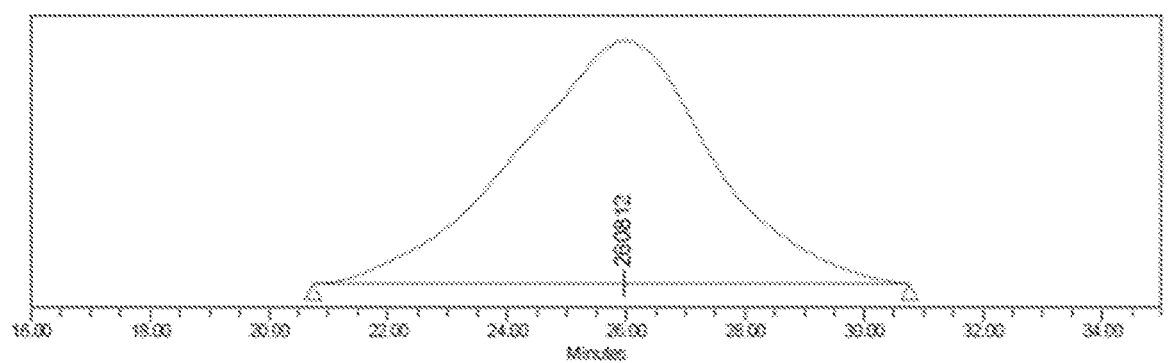
Figure 13A:
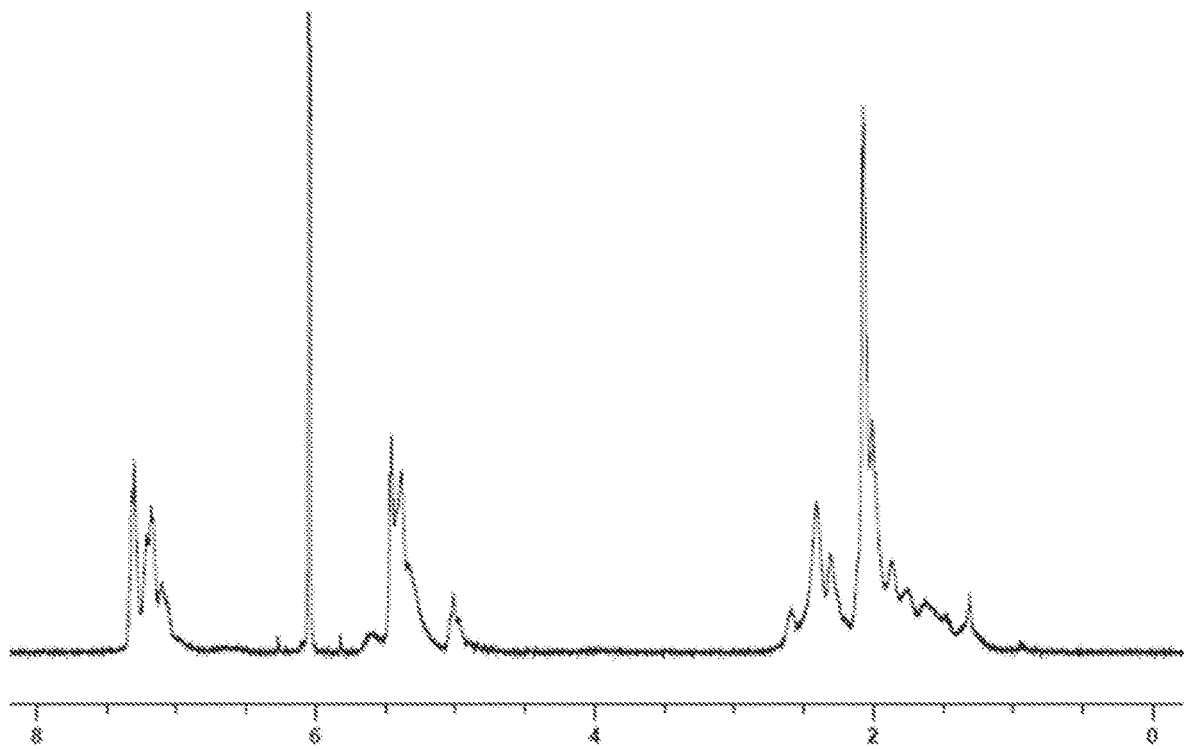
Figure 13B:
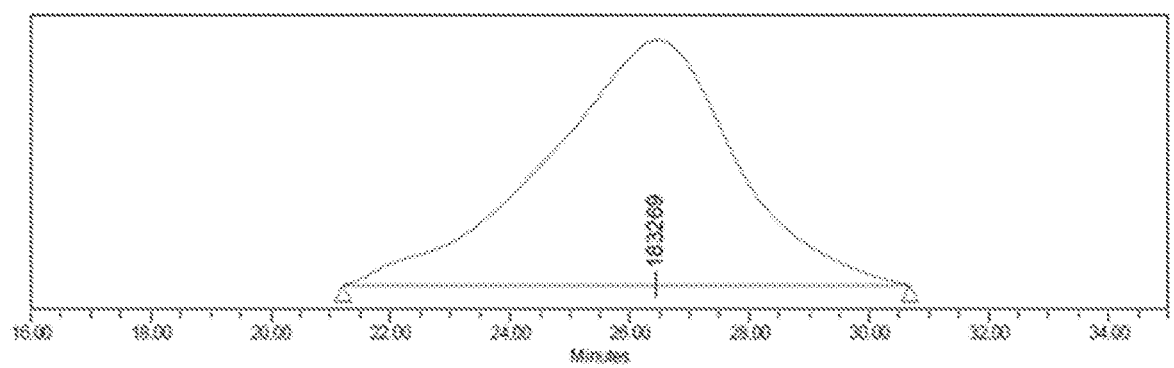

|  | NMR | GPC |
|---|---|---|
| Example 1 | FIG.8(a) | FIG.8(b) |
| Example 2 | FIG.9(a) | FIG.9(b) |
| Example 3 | FIG.10(a) | FIG.10(b) |
| Example 4 | FIG.11(a) | FIG.11(b) |
| Comparative example 1 | FIG.12(a) | FIG.12(b) |
| Comparative example 2 | FIG.13(a) | FIG.13(b) |

TABLE 4

|  | Number average molecular weight ($M_n$, g/mol) | Weight average molecular weight ($M_w$, g/mol) | Molecular weight distribution ($M_w/M_n$) |
|---|---|---|---|
| Example 1 | 202,802 | 518,691 | 2.56 |
| Example 2 | 182,749 | 532,953 | 2.92 |
| Example 3 | 183,214 | 539,391 | 2.94 |
| Example 4 | 190,689 | 553,804 | 2.90 |
| Comparative example 1 | 131,058 | 544,535 | 4.15 |
| Comparative example 2 | 108,623 | 462,871 | 4.26 |

When referring to tables 3 and 4 above, it can be confirmed that the conjugated diene-based random copolymers in examples 1 to 4 where seeded polymerization was carried out using the seed copolymers in preparation examples 1-1 to 1-4 have a molecular weight distribution ($M_w/M_n$) of less than 3, but comparative example 1 where seeded polymerization was carried out using the seed copolymer in comparative preparation example 1, and comparative example 2 following the conventional method for preparing the conjugated diene-based random copolymer have a molecular weight distribution exceeding 4.

Experimental Example 3

The physical properties of the respective sheet samples prepared in preparation example 2 and comparative preparation example 2 were measured, and the results thereof are shown in table 5 below.

Moony viscosity: A sample was attached to the front and back of the rotor, and mounted on a rotating viscometer (ALPHA Technologies, MONEY MV2000). After preheating up to 100° C. for the first 1 minute, the rotor was initiated, and the change in viscosity of the mixture for 4 minutes was measured, to measure the moony viscosity represented as $ML_{1+4}$@100° C.

Shore hardness: Shore hardness was measured using a SHORE-A hardness tester.

Tensile strength: Tensile strength was measured according to ASTM D412.

300% modulus and elongation: 300% modulus and elongation were measured using a universal test machine (UTM).

Abrasion loss: Abrasion loss was measured according to the measurement method of the Deutsche Industrie Normen (DIN).

tan δ: Hysteresis was measured under a deformation factor of 0.2, 10 Hz using the DTMA 5 machine of Rheometic.

TABLE 5

|  | Preparation example 2-1 | Preparation example 2-2 | Preparation example 2-3 | Preparation example 2-4 | Comparative preparation example 2-1 | Comparative preparation example 2-2 |
|---|---|---|---|---|---|---|
| Raw Moony viscosity ($ML_{1+4}$@100° C.) | 53 | 55 | 53 | 54 | 55 | 52 |
| Compound Moony viscosity ($ML_{1+4}$@100° C.) | 88 | 91 | 84 | 86 | 90 | 87 |
| Shore hardness | 69 | 70 | 68 | 68 | 69 | 68 |
| 300% modulus (kgf/cm$^2$) | 155 | 161 | 160 | 158 | 148 | 153 |
| Tensile strength (kgf/cm$^2$) | 232 | 246 | 235 | 236 | 219 | 229 |
| Elongation (%) | 408 | 418 | 413 | 411 | 383 | 393 |
| Tg (° C.) | −33.2 | −34.5 | −35.0 | −34.8 | −33.8 | −35.7 |
| tanδ@Tg | 0.9211 | 0.9286 | 0.9281 | 0.9223 | 0.9297 | 0.9321 |
| tanδ@0° C. | 0.1985 | 0.2021 | 0.2032 | 0.2071 | 0.1803 | 0.1865 |
| tanδ@60° C. | 0.135 | 0.130 | 0.131 | 0.133 | 0.149 | 0.145 |
| Abrasion loss (g) | 0.1184 | 0.1098 | 0.1123 | 0.1119 | 0.1331 | 0.1298 |

The traction properties are represented by tan δ at 0° C., and are known to be superior in proportion to an increase in the tan δ value. Rolling resistance is represented by tan δ at 60° C., and is known to be superior in proportion to a decrease in the tan δ value. Wear resistance can be confirmed through abrasion loss, and is superior in proportion to a decrease in abrasion loss.

When referring to table 5 above, it can be confirmed that the sample in preparation example 2 prepared based on a seed copolymer prepared by introducing reversible addition-fragmentation-chain transfer according to an embodiment of the present disclosure has uniformly improved wet traction (tan δ@0° C.), rolling resistance (tan δ@60° C.), and wear resistance as compared to the sample in comparative preparation example 2. Therefore, the sample can be usefully used as a material for tires such as tire tread, etc.

According to an aspect of the present disclosure, a conjugated diene random copolymer with excellent fuel efficiency for having a narrow molecular weight distribution, and a method for preparing the same may be provided.

According to another aspect of the present disclosure, a conjugated diene random copolymer introducing a third monomer having a functional group, and a method for preparing the same may be provided.

It should be understood that the effects of the present disclosure are not limited to the effects described above, but include all effects that can be deduced from the detailed description of the present disclosure or the constitution of the disclosure described in the claims.

The aforementioned description of the present disclosure is provided by way of example and those skilled in the art will understand that the present disclosure can be easily changed or modified into other specified forms without change or modification of the technical spirit or essential characteristics of the present disclosure. Therefore, it should be understood that the aforementioned examples are only provided by way of example and not provided to limit the present disclosure. For example, each of constituents described as a single form may be separately implemented and, similarly, constituents described as being separated may be implemented in a combined form.

It should be understood that the scope of the present disclosure is defined by the following claims and the disclosure is to cover all modifications, equivalents, and alternatives falling within the spirit and scope of the disclosure as defined by the claims.

What is claimed is:

1. A composition for seeded polymerization, comprising:
   a seed copolymer which comprises a compound comprising dithioate, a mercaptan compound, a first aromatic vinyl monomer, and a first conjugated diene monomer, and has an average particle diameter of 15-25 nm;
   a second aromatic vinyl monomer; and
   a second conjugated diene monomer,
   wherein:
      the weight average molecular weight of the seed copolymer is 20,000-250,000 g/mol, and the seed copolymer has a polydispersity index of particle diameter of 0.250 or less and a toluene-insoluble gel content of 10% or less.

2. The composition for seeded polymerization of claim 1, wherein the seed copolymer comprises a matrix comprising the first aromatic vinyl monomer and the first conjugated diene monomer, and the compound comprising dithioate dispersed in the matrix.

3. The composition for seeded polymerization of claim 1, wherein the compound comprising dithioate is represented by one of the following formulae 1 to 3:

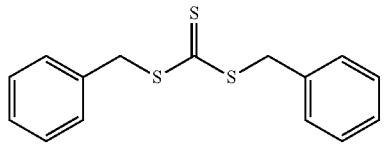
[Formula 1]

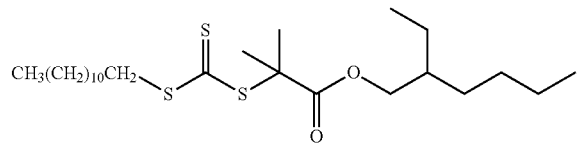
[Formula 2]

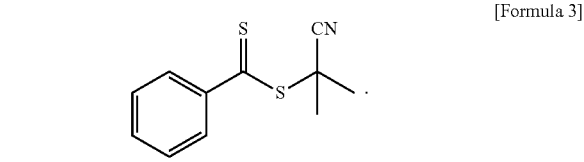
[Formula 3]

4. The composition for seeded polymerization of claim 1, wherein the mercaptan compound is n-dodecyl mercaptan.

5. The composition for seeded polymerization of claim 1, wherein the aromatic vinyl monomer is selected from the group consisting of styrene, α-methyl styrene, 2-methyl styrene, 3-methyl styrene, 4-methyl styrene, 2,4-dimethyl styrene, 2,4-diisopropyl styrene, 4-propyl styrene, 4-cyclohexyl styrene, 4-(p-methylphenyl)styrene, 5-tert-butyl-2-methyl styrene, tert-butoxy styrene, 2-tert-butyl styrene, 3-tert-butyl styrene, 4-tert-butyl styrene, N,N-dimethylaminoethyl styrene, 1-vinyl-5-hexyl naphthalene, 1-vinyl naphthalene, divinyl naphthalene, divinyl benzene, trivinyl benzene, vinyl benzyl dimethylamine, (4-vinyl benzyl)dimethyl amino ethyl ether, vinyl pyridine, vinyl xylene, diphenyl ethylene, diphenyl ethylene comprising tertiary amine, styrene comprising primary, secondary or tertiary amine, and a combination of two or more of the foregoing.

6. The composition for seeded polymerization of claim 1, wherein the conjugated diene monomer is selected from the group consisting of 1,3-butadiene, isoprene, 2,3-dimethyl-1,3-butadiene, 1,3-pentadiene, 1,3-hexadiene, 2-phenyl-1,3-butadiene, 3-methyl-1,3-pentadiene, 2-chloro-1,3-butadiene, 3-butyl-1,3-octadiene, octadiene and a combination of two or more of the foregoing.

7. The composition for seeded polymerization of claim 1, wherein the seed copolymer further comprises a monomer comprising a functional group.

8. The composition for seeded polymerization of claim 7, wherein the monomer comprising the functional group is one selected from the group consisting of glycidyl methacrylate, methyl methacrylate, acrylonitrile and a combination of two or more of the foregoing.

9. A conjugated diene copolymer, which is prepared by reacting the composition of claim 1, and has a molecular weight distribution of 3 or less.

10. The conjugated diene copolymer of claim 9, which is a random copolymer.

11. A molded body, comprising the conjugated diene copolymer of claim 9.

12. The molded body of claim 11, which is a tire tread.

13. A method for preparing a conjugated diene copolymer, comprising:
  (a) preparing a seed copolymer having an average particle diameter of 15-25 by reacting a compound comprising dithioate, a mercaptan compound, a first aromatic vinyl monomer and a first conjugated diene monomer; and
  (b) preparing a conjugated diene copolymer by reacting the seed copolymer, a mercaptan compound, a second aromatic vinyl monomer and a second conjugated diene monomer,
  wherein:
  the weight average molecular weight of the seed copolymer is 20,000-250,000 g/mol, and the seed copolymer has a polydispersity index of particle diameter of 0.250 or less and a toluene-insoluble gel content of 10% or less.

14. The method of claim 13, wherein the mole ratio of the compound comprising dithioate and the mercaptan compound is 1:0.5-1.5 in the step (a).

15. The method of claim 13, additionally reacting a monomer comprising a functional group in the step (a).

16. The method of claim 13, wherein the conversion rate of the first aromatic vinyl monomer and the first conjugated diene monomer in the step (a) is 70% or above.

17. The method of claim 13, wherein the reaction in the steps (a) and (b) is reversible addition-fragmentation chain transfer.

18. The method of claim 13, wherein the reaction in the step (b) is seeded polymerization.

* * * * *